United States Patent
Nakayama et al.

(10) Patent No.: US 7,007,715 B2
(45) Date of Patent: Mar. 7, 2006

(54) PRESSURE RELEASE VALVE

(75) Inventors: Junichi Nakayama, Fujisawa (JP);
Toshihiro Mukaida, Fujisawa (JP);
Tsuyoshi Kanda, Fukushima (JP);
Atsushi Saito, Nihonmatsu (JP); Kazuo Yamashita, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/496,376

(22) PCT Filed: Nov. 21, 2002

(86) PCT No.: PCT/JP02/12195

§ 371 (c)(1),
(2), (4) Date: Sep. 27, 2004

(87) PCT Pub. No.: WO03/044397

PCT Pub. Date: May 30, 2003

(65) Prior Publication Data
US 2005/0039806 A1  Feb. 24, 2005

(30) Foreign Application Priority Data
Nov. 22, 2001 (JP) ............... 2001-357111
Dec. 11, 2001 (JP) ............... 2001-376616
May 31, 2002 (JP) ............... 2002-158422

(51) Int. Cl.
F16K 15/14 (2006.01)

(52) U.S. Cl. ............. 137/512.4; 137/853; 137/854; 137/540; 220/203.11; 429/54; 361/521

(58) Field of Classification Search ........... 137/512.4, 137/843, 853, 854, 535, 540; 220/203.11, 220/203.29; 429/53, 54, 55; 174/17 VA; 361/521

See application file for complete search history.

(56) References Cited

U.S. PATENT DOCUMENTS

| 2,571,893 | A | * | 10/1951 | Kendall | 429/54 |
|---|---|---|---|---|---|
| 3,124,488 | A | * | 3/1964 | Ruetschi | 429/54 |
| 3,537,903 | A | * | 11/1970 | Braun | 429/54 |
| 3,595,429 | A | * | 7/1971 | Kohen | 220/203.13 |
| 3,648,728 | A | * | 3/1972 | Perry et al. | 137/854 |
| 4,296,186 | A | * | 10/1981 | Wolf | 429/54 |
| 4,780,378 | A | * | 10/1988 | McCartney et al. | 429/54 |
| 5,067,449 | A | * | 11/1991 | Bonde | 123/41.86 |
| 5,388,615 | A | * | 2/1995 | Edlund et al. | 137/859 |
| 6,562,517 | B1 | * | 5/2003 | Misra et al. | 429/225 |

FOREIGN PATENT DOCUMENTS

| JP | 45-17467 | 7/1970 |
|---|---|---|
| JP | 59-21574 | 9/1984 |
| JP | 1-128072 | 8/1989 |
| JP | 3-81460 | 8/1991 |
| JP | 5-75563 | 10/1993 |
| JP | 2000-135985 | 5/2000 |
| JP | 2001-513591 | 9/2001 |
| WO | WO99/07617 | 2/1999 |

* cited by examiner

Primary Examiner—Ramesh Krishnamurthy
(74) Attorney, Agent, or Firm—Jacobson Holman PLLC

(57) ABSTRACT

A shaft part is coaxially provided within a pressure release port provided in a sealing plate sealed to an opening portion of a case for a condenser or a battery, a valve body closely fitted and fixed within the pressure release port has a seal lip which is directed toward the outside of a pressure container and is closely contacted with an outer peripheral surface of the shaft part with predetermined tensional force, and in the case that internal pressure of the case is increased more than a predetermined value, the seal lip is operated so as to open the valve, thereby releasing the internal pressure to the atmospheric air.

4 Claims, 16 Drawing Sheets

PRESSURE RELEASE VALVE

This is a nationalization of PCT/JP02/12195 filed Nov. 21, 2002 and published in Japanese.

TECHNICAL FIELD

The present invention relates to a pressure release valve provided in a sealing plate of a pressure container in an electric or electronic part, for example, an electric battery (including a primary battery and a secondary battery), a fuel battery, a condenser and the like, or a pressure container in a general machinery.

BACKGROUND ART

In a closed type aluminum electrolytic condenser or an electric double layer type condenser or the like, an opening portion of a pressure container receiving an element main body thereof is closed by a sealing plate sealed via a gasket. In the case of the complete sealing structure as mentioned above, there is a risk that internal pressure of the container is increased on the basis of a Joule heat generation in the case that a sudden load is applied, whereby reduction in function and reduction in service life are caused. Accordingly, there has been conventionally developed a structure which can release a gas generated in the container, by forming a notch in a bottom portion of the pressure container so as to provide a rupture plate, or mounting a rubber cap to a cover so as to provide a safety valve, thereby preventing the pressure container from being ruptured, or by mounting a breather having the function of transmitting the gas and not transmitting the liquid to a sealing plate by the way of applying a water repelling treatment to a porous membrane made of, for example, PTFE or the like so as to release the internal pressure of the container.

In accordance with the prior art, in the case that the sealing plate has the rupture plate or the safety valve, once the container is ruptured, the sealing plate can not be used thereafter, whereby it is impossible to use the sealing plate repeatedly.

Further, the breather provided in the sealing plate has a function of keeping the internal pressure of the pressure container constant, and preventing an internally sealed liquid such as an electrolytic solution or the like from leaking, however, since the gas within the container is discharged slightly from the breather even by heat and internal pressure generated in a normal use state, the electrolytic solution tends to be reduced due to evaporation, and water vapor tends to make an intrusion from the external. Further, under a bad environment, there is a case that the porous membrane of the breather generates clogging, and it is hard to expect a stable performance. Further, since the breather can not respond to a sudden internal pressure increase, it is necessary to provide additionally with an explosion proofing valve for releasing the internal pressure in a moment of time in the case that the internal pressure becomes a predetermined value or more and preventing the container from being exploded.

The present invention is made by taking the points mentioned above into consideration, and a technical object of the present invention is to provide a pressure release valve which can securely achieve a pressure release function repeatedly because the pressure release valve is not broken due to a pressure release at a time when an internal pressure is increased, in addition to a breather function of preventing a sealed liquid from being evaporated and preventing foreign matter from making an intrusion from the external.

DISCLOSURE OF THE INVENTION

As a means for effectively achieving the technical object mentioned above, in accordance with a first aspect of the present invention, there is provided a pressure release valve comprising:

a pressure release port provided in a sealing plate sealed in an opening portion of a pressure container;

a shaft part coaxially provided within the pressure release port and fixed to the sealing plate; and a valve body closely fitted and fixed within the pressure release port, wherein the valve body has a seal lip which is directed to the outside of the pressure container and is closely contacted with an outer peripheral surface of the shaft part by predetermined tensional force. In other words, the pressure release valve is normally closed so as to hermetically close the inside of the pressure container, and is structured such that in the case that internal pressure of the pressure container is increased more than a predetermined value, the seal lip is operated so as to open the valve, thereby releasing the internal pressure to the atmospheric air.

In accordance with a second aspect of the present invention, there is provided a pressure release valve comprising:

a tubular holding portion formed in a protruding manner in a sealing plate sealed in an opening portion of a pressure container and provided with a pressure release port in an inner periphery; and a valve body held in the tubular holding portion, wherein the valve body has a seal lip which is closely contacted with the tubular holding portion by predetermined tensional force and is operated so as to open the valve by predetermined internal pressure within the pressure container, and a locking portion to the tubular holding portion, and the locking state of the locking portion is cancelled at a time when predetermined pressure higher than valve opening pressure of the seal lip is applied. In other words, the pressure release valve is normally closed so as to hermetically close the inside of the pressure container, and is structured such that in the case that internal pressure of the pressure container is increased more than a predetermined value, the seal lip is operated so as to open the valve, thereby releasing the internal pressure to the atmospheric air, and in the case that high pressure which can not be released by the valve opening operation of the seal lip is applied, the locking state by the locking portion is cancelled, and the valve body is released from the tubular holding portion and rapidly releases the internal pressure.

In accordance with a third aspect of the present invention, there is provided a pressure release valve as described in the first aspect, wherein a base portion made of a rubber-like elastic material in the valve body is closely fitted to an inner peripheral surface of the pressure release port with a proper collapsing margin, and a desired number of recess portions are formed at a fitting position to the base portion in the inner peripheral surface of the pressure release port. The recess portion increases a disengagement load of the valve body with respect to the inner peripheral surface of the pressure release port on the basis of the fitting to the base portion.

In accordance with a fourth aspect of the present invention, there is provided a pressure release valve as described in the first or second aspect, wherein the seal lip has a plurality of lip portions.

In accordance with a fifth aspect of the present invention, there is provided a pressure release valve as described in the first or second aspect, wherein a spring for supplementing the tensional force of the seal lip is attached to the valve body.

In accordance with a sixth aspect of the present invention, there is provided a pressure release valve as described in the second aspect, wherein the valve body has a base portion arranged so as to close an outer end opening portion of the pressure release port, the seal lip is extended from an outer periphery of the base portion so as to be closely contacted with an outer peripheral surface of the tubular holding portion, the locking portion is formed in a leading end of an elastic shaft part which is formed by a rubber-like elastic material so as to extend in an axial direction in an inner peripheral side of the seal lip from the base portion and is loosely inserted to the pressure release port, and a pressure passage is formed between the tubular holding portion and the base portion, and the elastic shaft part.

In accordance with a seventh aspect of the present invention, there is provided a pressure release valve as described in the second or sixth aspect, wherein the locking portion is locked to an inner end opening portion of the pressure release port in the state of the pressure passage being opened.

In accordance with an eighth aspect of the present invention, there is provided a pressure release valve as described in the second or sixth aspect, wherein the locking portion is pressure-inserted to the inner periphery of the pressure release port with a predetermined collapsing margin, thereby being locked.

In accordance with a ninth aspect of the present invention, there is provided a pressure release valve as described in the third aspect, wherein the recess portion is extended in the axial direction toward a position in correspondence to a portion between a plurality of bridging portions connecting the pressure release port to the shaft part.

In accordance with a tenth aspect of the present invention, there is provided a pressure release valve as described in any one of the first to ninth aspects, wherein the pressure container is a case of a condenser, a capacitor or a battery.

BRIEF DESCRIPTION OF THE DRAWINGS

FIGS. 1A and 1B show a schematic structure of an electrolytic condenser or an electrolytic solution battery to which a pressure release valve in accordance with the present invention is applied, in which FIG. 1A is a vertical cross sectional view and FIG. 1B is a plan view.

BEST MODE FOR CARRYING OUT THE INVENTION

Figure 1A:
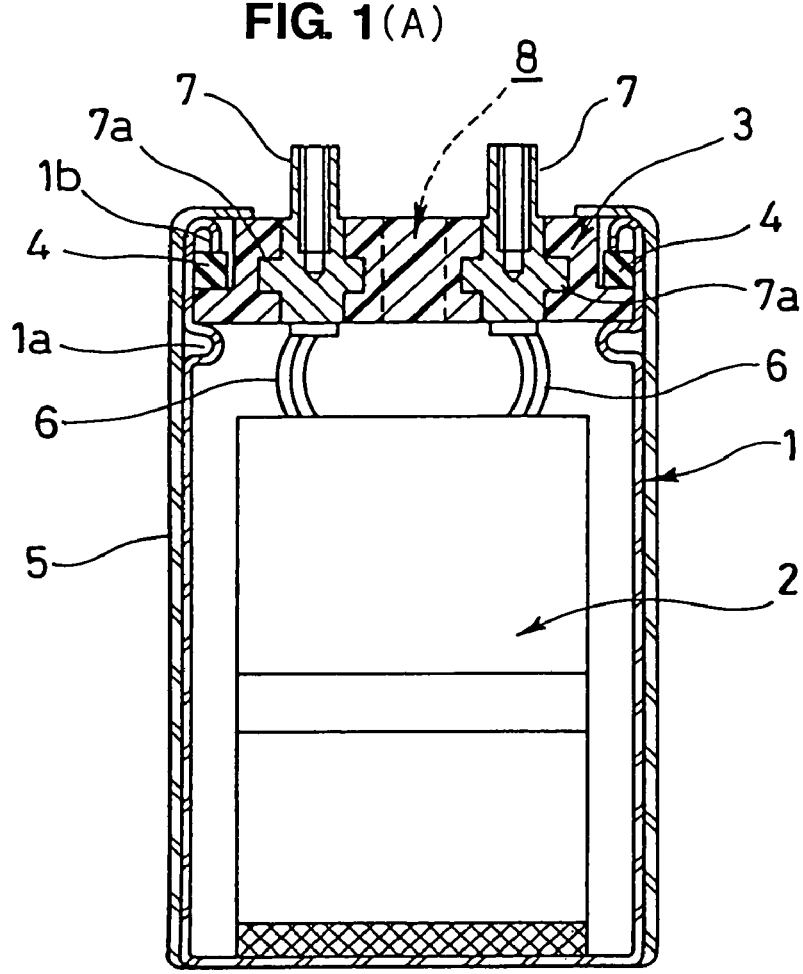
Figure 1B:
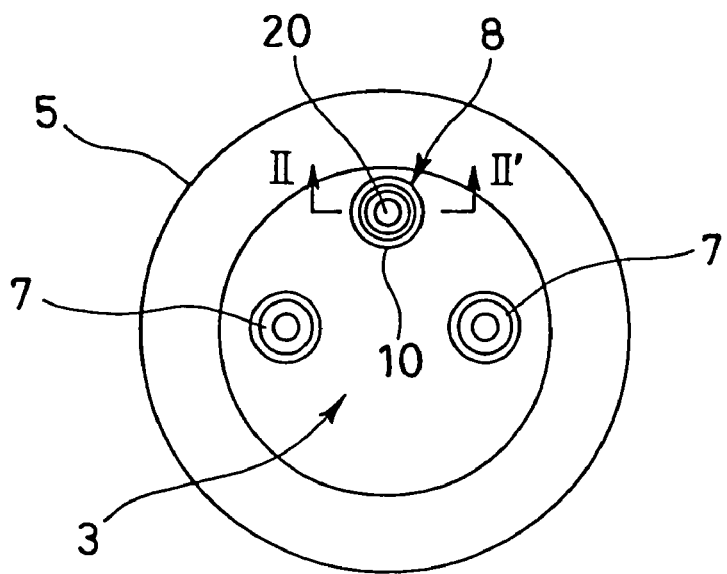

FIGS. 1A and 1B show a schematic structure of an electrolytic condenser or an electrolytic solution battery to which a pressure release valve in accordance with the present invention is applied, in which FIG. 1A is a vertical cross sectional view and FIG. 1B is a plan view. A main body element 2 of a condenser or a battery is received within a closed-end cylindrical case 1 corresponding to a pressure container made of a metal such as an aluminum or the like, and an upper end opening portion of the case 1 is closed by a sealing plate 3 which is formed in a disc shape by a synthetic resin material or an elastomer having an electrical insulating property. The main body element 2 is impregnated with an electrolytic solution sealed within the case 1.

An outer peripheral portion of the sealing plate 3 is fixed in a sealing manner to a portion between a caulked portion 1b formed by an upper end portion of the case 1 being folded back inside, and a draw portion 1a positioned in a lower side of the caulked portion and continuously formed in a circumferential direction of the case 1, via an annular gasket 4 made of a rubber-like elastic material. Further, an outer periphery of the case 1 is covered by an outer canister 5.

The sealing plate 3 is made of the electrical insulating synthetic resin material or elastomer, or a laminated plate material of the synthetic resin material and the elastomer, as mentioned above.

The synthetic resin material can be selected from a thermoplastic resin such as a polyolefine resin, a polyolefine resin polymerized by a metallocene catalyst, a polyphenylene sulfide, a syndiotactic polystyrene, a polyamide resin, a polyester resin, a polyimide resin, a polyamide imide resin, a liquid crystal resin and the like, a thermosetting resin such as a phenol resin, an epoxy resin, an imide resin and the like, and there are appropriately blended a filler, for example, a fibrous filler such as a glass fiber, a carbon fiber, a whisker and the like, a particulate filler such as a carbon particle, a mica, a glass bead and the like, a reinforcing material, a metal oxide, a process aid and the like. Further, the elastomer can be selected from a saturated rubber material such as a butyl rubber, a halogenoid butyl rubber, a butyl rubber containing a vinyl group, an ethylene propylene rubber (EPDM), a fluorocarbon rubber, an acrylic rubber, a hydrogenated nitrile rubber and the like, and there are appropriately blended a cross linking agent, a filler, a plasticizer, an age resister and the like. Further, the thermoplastic elastomer can be selected from an olefin thermoplastic elastomer, an ester thermoplastic elastomer, an amide thermoplastic elastomer, and a styrene thermoplastic elastomer such as a styrene elastomer, for example, a hydrogenated styrene butadiene block copolymer, a hydrogenated styrene isoprene block copolymer and the like, and is manufactured in accordance with a block copolymerizing method, a graft coplymerizing method, a dynamic bridging method and the like, and there are appropriately blended the cross linking agent, the plasticizer, the age resister, the filler and the like. In the elastomer such as a mixture of the resin material and the rubber, the block copolymer, the graft copolymer or the like, it is possible to select from a mixture of a phenol resin and a nitrile rubber hydroxide, an acrylic rubber, a butyl rubber or a fluorine rubber.

The sealing plate 3 is provided with a pair of electrode terminals 7 respectively connected to the element main body 2 via a lead wire 6 so as to extend in the thickness direction, and is provided with a pressure release valve 8 in accordance with the present invention. The electrode terminals 7 and 7 are integrally formed in a state of being partly buried in the sealing plate 3 in accordance with an insert molding, and each of them is prevented from coming off with respect to the sealing plate 3 by a collar portion 7a formed in an outer peripheral surface.

[First Aspect]

Figure 2:
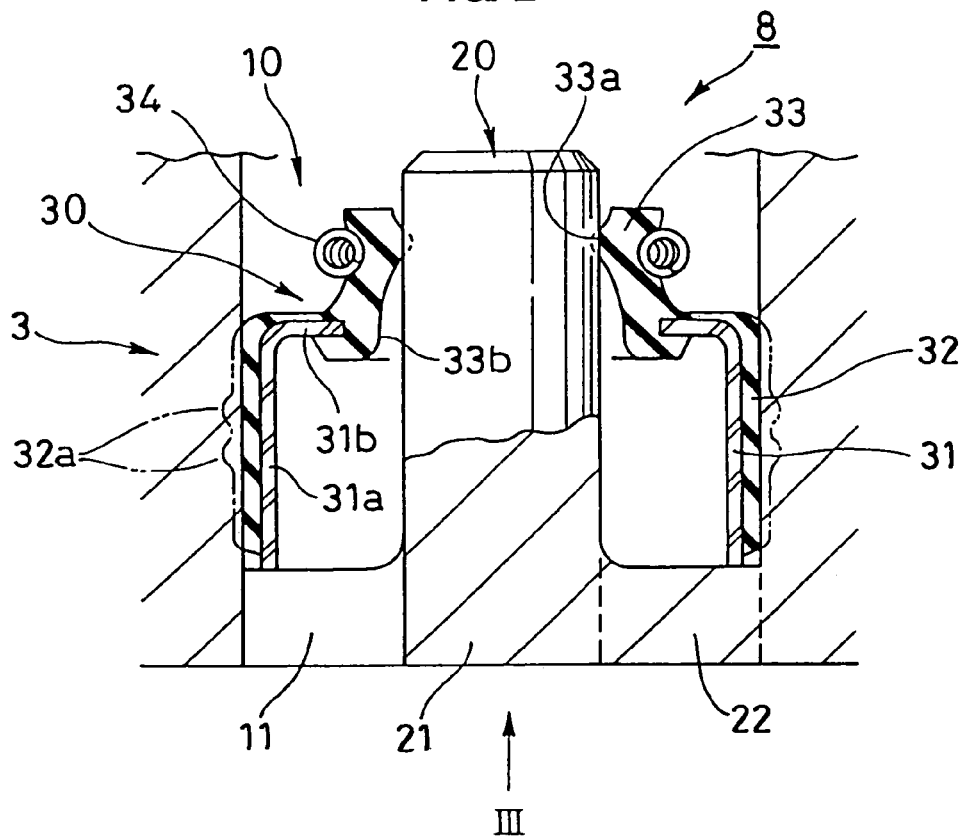
FIG. 2 is a cross sectional view showing a first preferable aspect of a pressure release valve applied to the electrolytic condenser or the electrolytic solution battery shown in FIGS. 1A and 1B, in a state of cutting along a line II–II' in FIG. 1B.
Figure 3:
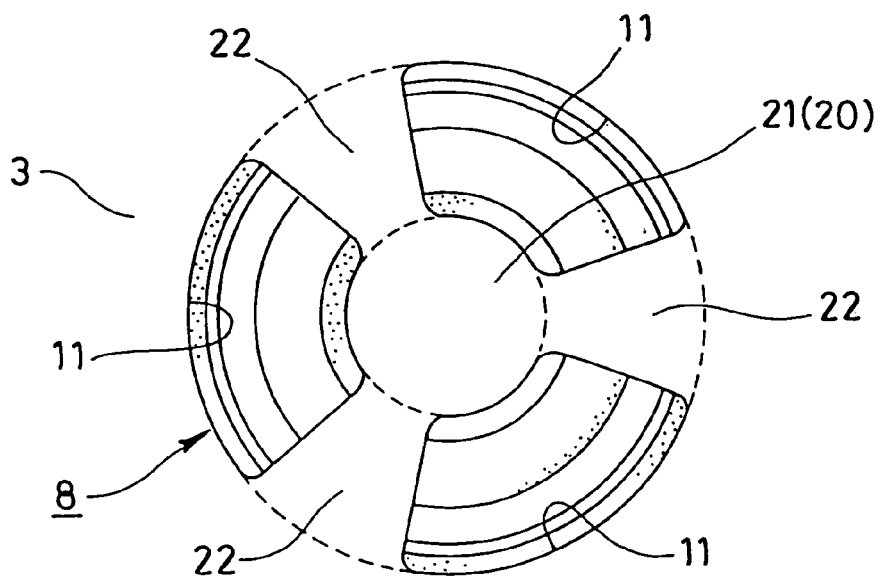
FIG. 3 is a view as seen from a direction III in FIG. 2.
Figure 4:
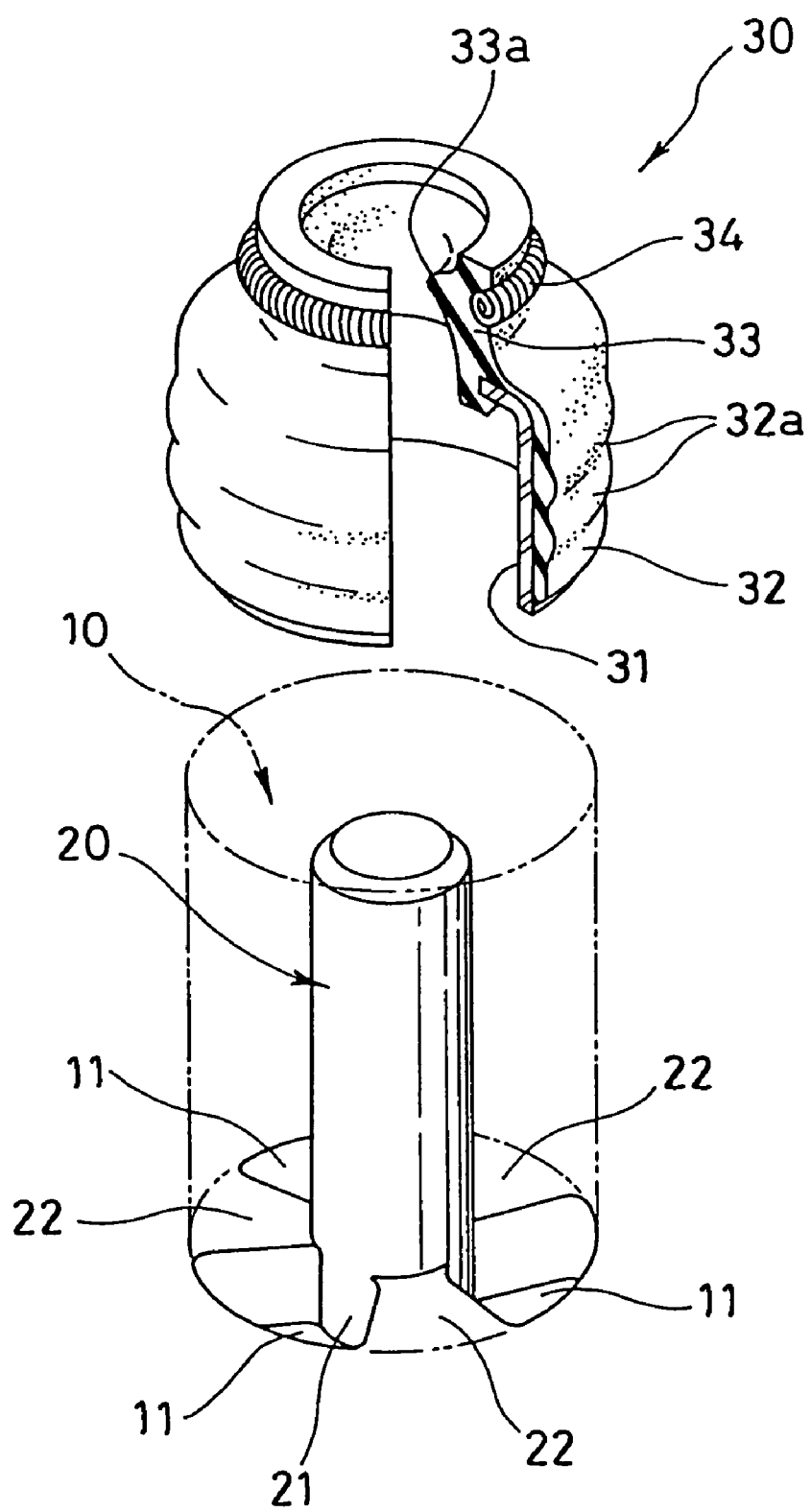
FIG. 4 is a cross sectional perspective view of the pressure release valve shown in FIG. 2.

FIG. 2 is a cross sectional view showing a first preferable aspect of the pressure release valve 8 applied to the electrolytic condenser or the electrolytic solution battery shown in FIGS. 1A and 1B, in a state of cutting along a line II–II' in FIG. 1B, FIG. 3 is a view as seen from a direction III in FIG. 2, and FIG. 4 is a cross sectional perspective view of the pressure release valve 8 shown in FIG. 2. The pressure release valve 8 in accordance with the present aspect is constituted by a pressure release port 10 provided in the sealing plate 3, a shaft part 20 coaxially provided within the pressure release port 10 and integrally formed with the sealing plate 3, and valve body 30 closely fitted and fixed within the pressure release port 10, as shown in FIGS. 2 to 4.

In detail, the shaft part 20 is formed in a columnar shape, and is fixed to an inner peripheral surface of an inner end (an end portion of the case 1 in an inner chamber side) in the circular pressure release port 10. The shaft part 20 and the bridging portion 22 is made of the same synthetic resin material as that of the sealing plate 3, that is, are formed as an integral structure which is continuously formed with the sealing plate 3. Further, the inner end opening portion in the pressure release port 10 is divided in the circumferential direction by the bridging portion 22, and is formed as three fan-shaped holes 11.

The vale main body 30 is integrally formed on a reinforcing ring 31 by a rubber-like elastic material, and has a base portion 32, a seal lip 33 extended from an inner periphery of one end thereof, and an extension spring 34 attached to an outer peripheral surface near a leading end in the seal lip 33. Further, the valve body 30 is attached to a portion between the pressure release port 10 and the shaft part 20 in such a manner that the seal lip 33 is directed to an outer side of the sealing plate 3.

As a material of the rubber-like elastic material forming the base portion 32 and the seal lip 33, it is possible to select a saturated rubber material such as a butyl rubber, a halogenoid butyl rubber, a butyl rubber containing a vinyl group, an ethylene propylene rubber (EPDM), a fluorocarbon rubber, an acrylic rubber, a hydrogenated nitrile rubber and the like, and there are appropriately blended a cross linking agent, a filler, a plasticizer, an age resister and the like. Further, the thermoplastic elastomer can be selected from an olefin thermoplastic elastomer, an ester thermoplastic elastomer, an amide thermoplastic elastomer, and a styrene thermoplastic elastomer such as a hydrogenated styrene butadiene block copolymer, a hydrogenated styrene isoprene block copolymer and the like, and is manufactured in accordance with a block copolymerizing method, a graft copolymerizing method, a dynamic bridging method and the like, and there are appropriately blended the cross linking agent, the plasticizer, the age resister, the filler and the like. In the elastomer such as a mixture of the resin material and the rubber, the block copolymer, the graft copolymer or the like, it is possible to select from a mixture of a phenol resin and a nitrile rubber hydroxide, a butyl rubber or a fluorine rubber.

The reinforcing ring 31 in the valve body 30 may be formed in a simple cylindrical shape for downsizing the valve body 30, however, in view of making a gas permeable area small, it is preferable to form in an approximately L-shaped cross section constituted by a tubular portion 31a and an end wall portion 31b extending to an inner peripheral side from one end of the tubular portion 31a, as illustrated.

A material of the reinforcing ring 31 is a metal material such as an iron, a copper, a titanium, a nickel and the like, however, it is preferable to employ a stainless steel, a synthetic resin, a ceramic and the like which are excellent in a corrosion resistance. In the case of employing the material having the corrosion resistance, the reinforcing ring 31 may be exposed or not be exposed to the electrolytic solution side, however, in the case of employing the material having no corrosion resistance, it is necessary to set the reinforcing ring in a completely buried state so as to prevent from being exposed to the electrolytic solution side.

The base portion 32 made of the rubber-like elastic material is integrally bonded in a vulcanizing manner to an outer peripheral surface of the tubular portion 31a in the reinforcing ring 31, and a plurality of protrusions 32a which are continuously provided in the circumferential direction are formed in an outer peripheral surface of the base portion 32. Further, the seal lip 33 made of the rubber-like elastic material is integrally bonded in a vulcanizing manner to the end wall portion 31b of the reinforcing ring 31, and is continuously formed from the base portion 32.

An outer diameter of the tubular portion 31a of the reinforcing ring 31 is appropriately smaller than an inner diameter of the pressure release port 10 in the sealing plate 3, and an outer diameter of the base portion 32 including the protrusion 32a is appropriately larger than the inner diameter of the pressure release port 10 in a state of not being attached. Accordingly, in a state in which the valve body 30 is pressure-attached to the sealing plate 3, the base portion 32 is closely fitted to the inner peripheral surface of the pressure release port 10 with a proper collapsing margin, as shown by a two-dot chain line in FIG. 2, and since a compression amount is particularly larger in the protrusion 32a, the base portion 32 is firmly fixed to the pressure release port 10 and achieves an excellent sealing performance.

Inner diameters of the end wall portion 31b of the reinforcing ring 31 and a heel-shaped end portion 33b of the seal lip 33 bonded to the end wall portion 31b are appropriately larger than the outer diameter of the shaft part 20, and an inner diameter of the lip portion 33a formed in an inner periphery of the leading end of the seal lip 33 is appropriately smaller than the outer diameter of the shaft part 20 in a state of not being attached as shown in FIG. 4. Further, the extension spring 34 is formed in an annular shape by bonding both ends of a coil spring, is fitted to a circular peripheral groove formed in an outer peripheral surface of the seal lip 33 in a suitably widened state, and compensates for a softening of the seal lip 33 at a high temperature and a reduction of the tensional force due to a deterioration with age (aging) of the rubber material. As a material of the extension spring 34, a metal material such as an iron, a copper, a titanium, a nickel and the like is selected, however, it is preferable to employ a stainless steel which is excellent in a corrosion resistance.

Figure 15:
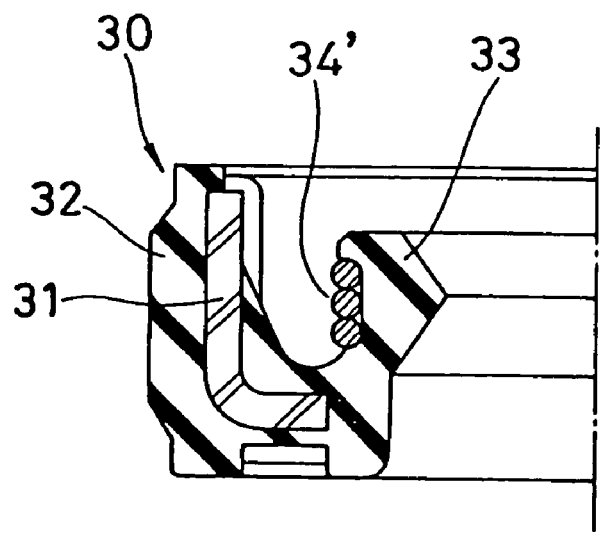
FIG. 15 is a half cross sectional view of a valve body using a coil spring in the third aspect.
Figure 16:
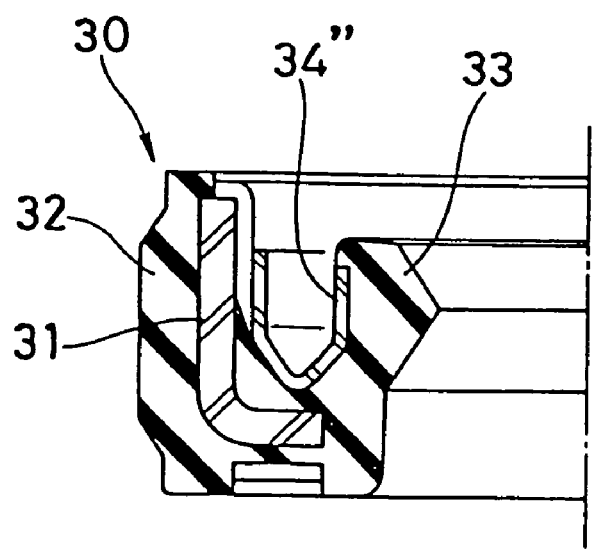
FIG. 16 is a half cross sectional view of a valve body using a leaf spring in the third aspect.

Accordingly, in the attached state of the valve body 30 to the sealing plate 3, as shown in FIG. 2, the seal lip 33 is closely contacted with the outer peripheral surface of the shaft part 20 by a tensile force of its own elasticity and a tensile force of the extension spring 34, in a state in which the lip portion 33a has a proper collapsing margin shown by a broken line in FIG. 2. In this case, as a means for compensating for the reduction in the tensional force of the seal lip 33 due to the temperature and the aging, the other spring than the extension spring 34 may be employed as shown in FIGS. 15 and 16 mentioned below as far as the means is an elastic body having a fastening effect. Further, in some set values of the valve opening pressure, the temperature condition and the like, it is not always necessary to provide such a spring.

The valve body 30 can be pressure-inserted and attached to the pressure release port 10 of the sealing plate 3 after filling the electrolytic solution into the case 1 in a final assembling step of the condenser or the battery. Accordingly, it is possible to restrict the evaporation of the electrolytic solution generated in the assembling process to the minimum and it is possible to stabilize the quality of the product.

The pressure release valve 8 provided with the structure mentioned above is opened in the case that the internal pressure of the case 1 is increased more than a predetermined value, thereby releasing the internal pressure to the atmospheric air and preventing the case 1 from being broken due to an abnormal increase of the internal pressure.

The pressure of the gas generated on the basis of the reaction of the electrolytic solution sealed within the case 1 (the internal pressure of the case 1) reaches an inner peripheral space of the valve body 30 within the pressure release port 10 via the fan-shaped hole 11, and the internal pressure is applied to the inner peripheral surface of the seal lip 33 as a valve opening force for opening the seal lip 33 to an outer peripheral side. Accordingly, when the valve opening force on the basis of the internal pressure of the case 1 becomes larger than a valve closing force on the basis of the elasticity of the seal lip 33 and the tensional force of the extension spring 34, the lip portion 33a of the seal lip 33 is apart from an outer peripheral surface of the shaft part 20 so as to be in a valve opening state, and releases the internal pressure of the case 1 to the atmospheric air in the external via the pressure release port 10. Further, since the heat within the case 1 is also discharged to the atmospheric air at this time, it is possible to prevent the condenser or the battery from being reduced in function due to the heat. Further, since the valve is closed immediately on the basis of a restoring force generated by the elasticity of the seal lip 33 and the tensional force of the extension spring 34 in the case that the internal pressure is released, it is possible to shut off the intrusion of the water vapor and the foreign matter from the external.

In this case, the pressure value (the valve opening pressure) at a time when the seal lip 33 of the valve body 30 is opened on the basis of the increase of the internal pressure of the case 1 can be optionally set on the basis of the inner diameter and the cross sectional shape of the seal lip 33, the outer diameter of the shaft part 20, the tensional force of the extension spring 34 and the like. accordingly, the valve opening pressure can be suitably set while taking the value of the gas pressure caused by the heat generated in the normal use state into consideration.

In this case, it is preferable that the working of the outer peripheral surface of the shaft part 20 is made such that the contact area of the seal lip 33 is not communicated in the axial direction, in view of the sealing property achieved by the seal lip 33.

[Second Aspect]

Figure 5:
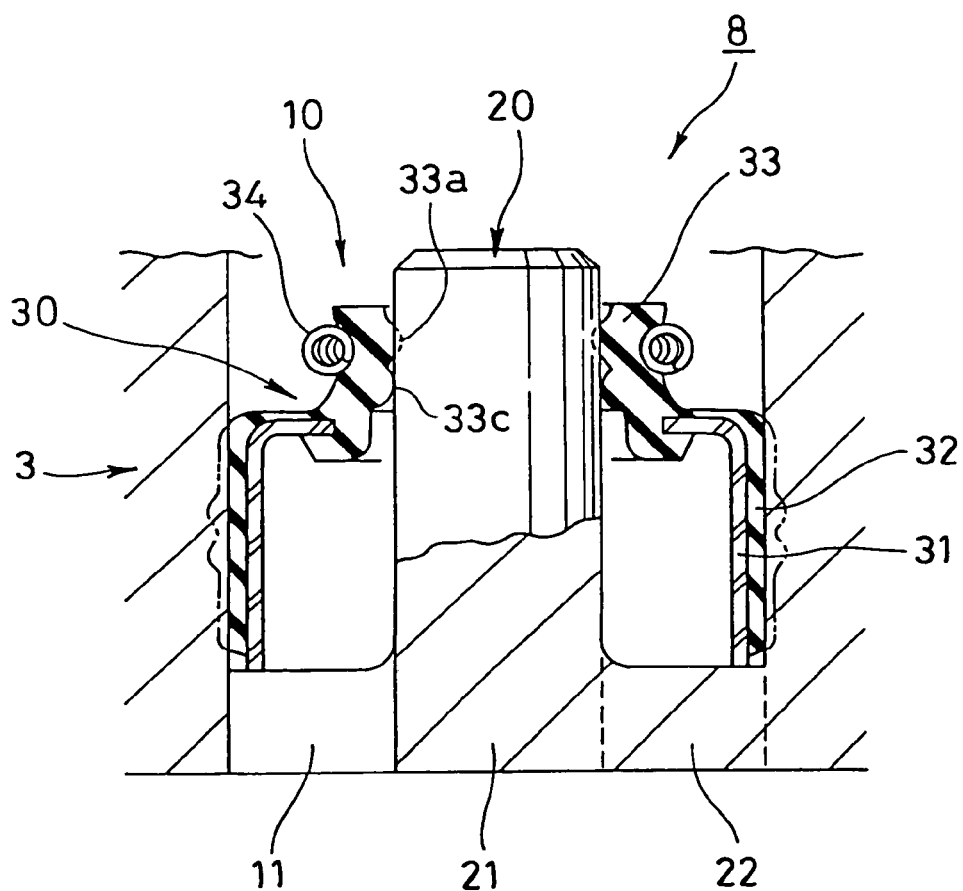
FIG. 5 is a cross sectional view showing a second preferable aspect of the pressure release valve applied to the electrolytic condenser or the electrolytic solution battery shown in FIGS. 1A and 1B, in a state of cutting along a line II–II' in FIG. 1B.

FIG. 5 is a cross sectional view showing a second preferable aspect of the pressure release valve 8 applied to the electrolytic condenser or the electrolytic solution battery shown in FIGS. 1A and 1B, in a state of cutting along a line II–II' in FIG. 1B, as an example of modifying the cross sectional shape of the seal lip 33. In the pressure release valve 8 in accordance with this aspect, a plurality of (two in the illustrated embodiment) lip portions 33a and 33c are formed in an inner periphery of a leading end of the seal lip 33 in the valve body 30. Accordingly, the sealing property in the valve closing state is further improved, and the valve opening pressure can be made higher due to the existence of the lip portion 33c in comparison with the structure shown in FIGS. 2 and 3.

Further, the internal pressure of the case 1 is also applied to the direction of pulling out the valve body 30 from the pressure release port 10, however, a sufficient pressure contact force caused by the collapsing margin of the base portion 32 is set to the inner peripheral surface of the pressure release port 10 in such a manner as to prevent the valve body 30 from easily moving in the pulling-out direction by such a pressure as the valve opening pressure of the seal lip 33.

When the internal pressure of the case 1 is decreased to the predetermined value or less on the basis of the valve opening of the seal lip 33 as mentioned above, the seal lip 33 is operated so as to close the valve on the basis of the valve closing force generated by its own elasticity and the tensional force of the extension spring 34, and the lip portion 33a is closely contacted with the outer peripheral surface of the shaft part 20 so as to close the pressure release port 10.

In other words, since the internal pressure of the case 1 is the set valve opening pressure or less under the normal use state, there is achieved the valve closing state in which the seal lip 33 is in close contact with the shaft part 20, and it is possible to prevent the water vapor and the foreign matter from making an intrusion from the external portion. Further, as mentioned above, since the seal lip 33 is in the valve opening state only in the case that the expanding force caused by the internal pressure is increased more than the valve opening pressure, it is possible to restrict the reduction of the electrolytic solution due to the evaporation or the like to the minimum, and it is possible to improve the service life of the condenser or the battery.

In this case, in each of the aspects mentioned above, the sealing plate 3 is formed by the synthetic resin material, the elastomer or the like as described above, and in order to make a mold release after molding easy, an inner peripheral surface 12 of the pressure release port 10 is formed with a slope that the diameter of the inner peripheral surface 12 varies slightly larger in the metal mold extracting direction, that is, toward an outer opening end portion corresponding to the opposite side to the bridging portion 22. Further, a stress relief with age is generated in the rubber-like elastic material constituting the base portion 32 of the valve body 30, and a permanent strain with age is generated in the inner peripheral surface 12 itself of the pressure release port 10 made of the synthetic resin material due to the application of the expanding force from the base portion 32. Accordingly, there is fear that the valve body 30 tends to be pulled out from the pressure release port 10.

[Third Aspect]

Figure 6:
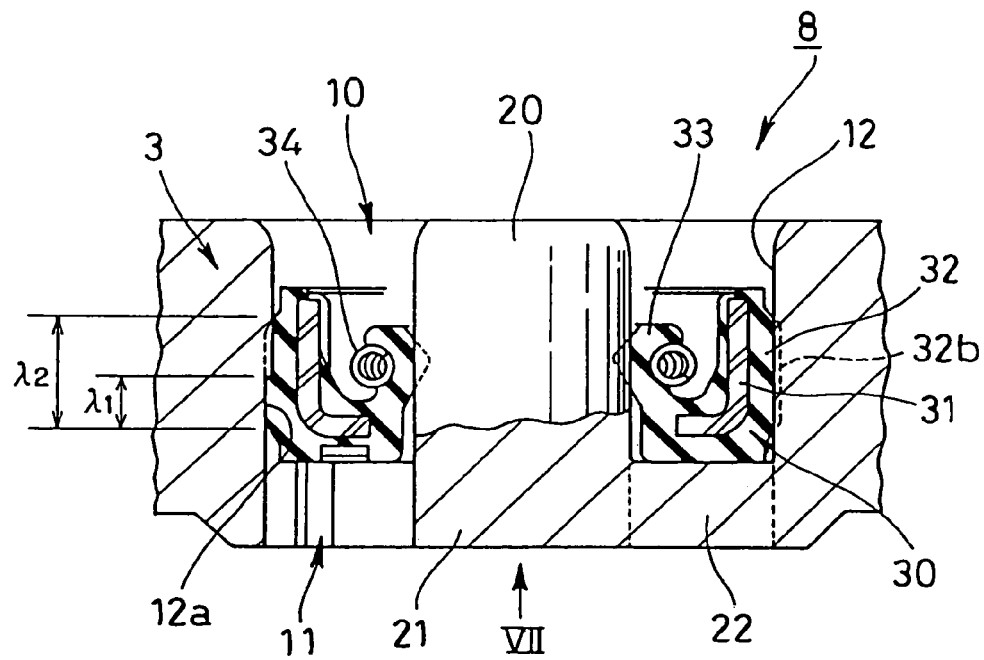
FIG. 6 is a cross sectional view showing a third preferable aspect of the pressure release valve applied to the electrolytic condenser or the electrolytic solution battery shown in FIGS. 1A and 1B, in a state of cutting along a line II–II' in FIG. 1B.
Figure 7:
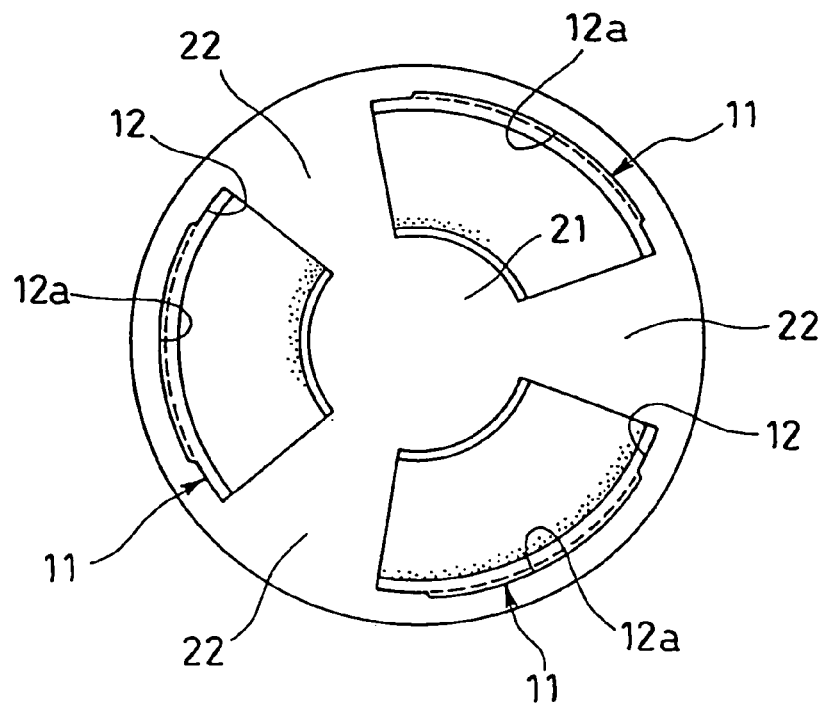
FIG. 7 is a view as seen from a direction VII in FIG. 6.
Figure 8:
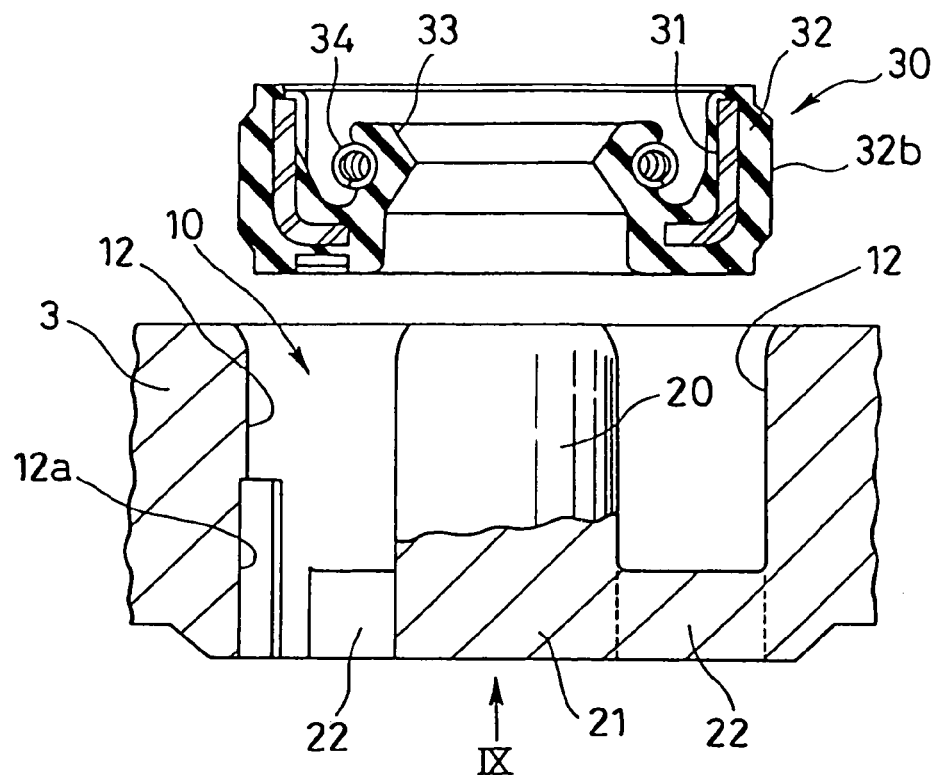
FIG. 8 is a cross sectional view showing a state in which the valve body is not attached, in accordance with the third aspect.
Figure 9:
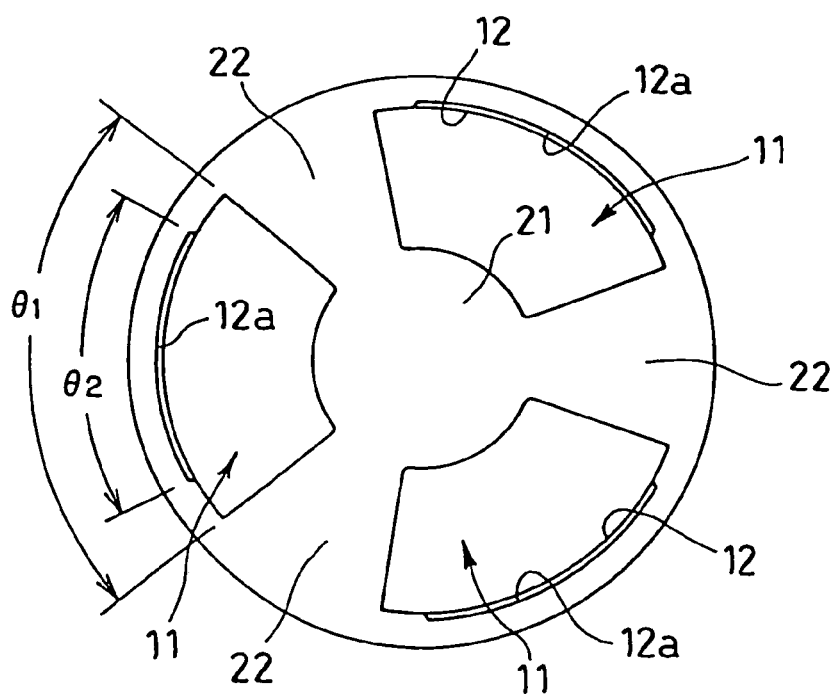
FIG. 9 is a view as seen from a direction IX in FIG. 8.
Figure 10:
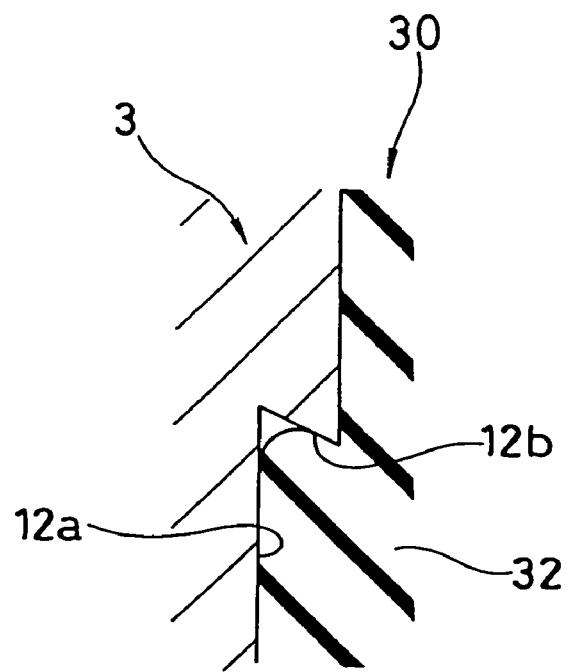
FIG. 10 is a partly enlarged cross sectional view of FIG. 6.
Figure 11:
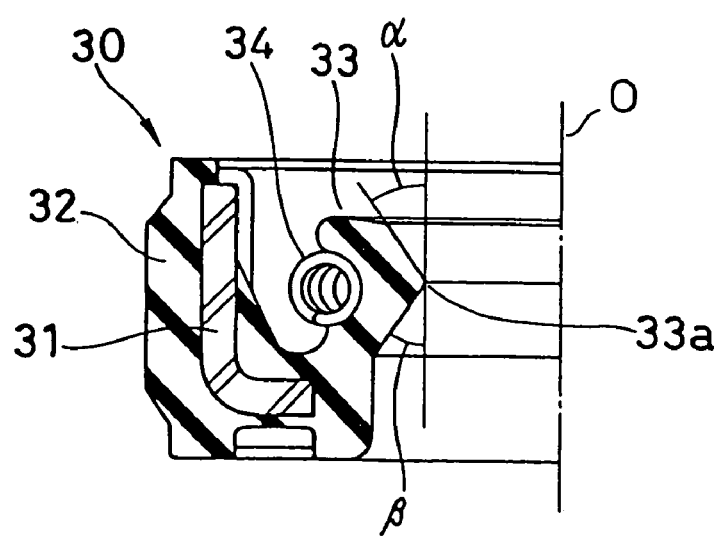
FIG. 11 is a half cross sectional view of the valve body in the third aspect.

FIG. 6 is a cross sectional view showing a third preferable aspect of the pressure release valve 8 preventing the valve body 30 from being pulled out, taking the above matters into consideration, in a state of cutting along a line II–II' in FIG. 1B, and FIG. 7 is a view as seen from a direction VII in FIG. 6. Further, FIG. 8 is a cross sectional view showing a state in which the valve body 30 is not attached, in accordance with this aspect, FIG. 9 is a view as seen from a direction IX in FIG. 8, FIG. 10 is a cross sectional view showing a part of FIG. 6 in an enlarged manner, and FIG. 11 is a half cross sectional view of the valve body 30 in accordance with this aspect. The pressure release valve 8 in accordance with this aspect is structured such that a recess portion 12a is formed in the inner peripheral surface 12 of the pressure release port 10 of the sealing plate 3 formed by the synthetic resin material, the elastomer or the like.

The recess portion 12a is formed in a stepped shape in correspondence to an opening range of each of the fan-shaped holes 11 between the bridging portions 22 radially extending from a base end portion 21 of the shaft part 20 at a uniform interval in the circumferential direction, and is extended to an intermediate portion of an attaching position of the valve body 30 in the axial direction from an inner end (a lower end in FIG. 6) in the inner peripheral surface 12 of the pressure release port 10.

For details, on the assumption that an axial length of the recess portion 12a in the fitting portion of the base portion 32 of the valve body 30 is set to $\lambda_1$, and an axial length of a pressure contact portion 32b (mentioned below) of the valve body 30 closely fitted to the inner peripheral surface 12 of the pressure release port 10 is set to $\lambda_2$, as shown in FIG. 6, the value $\lambda_1$ is about 20 to 80% of the value $\lambda_2$. Further, on the assumption that an opening range of the fan-shaped hole 11 with respect to the circumferential direction is set to $\theta_1$, and a forming range of the recess portion 12a with respect to the circumferential direction is set to $\theta_2$, as shown in FIG. 9, a relation $\theta_1 \geq \theta_2 \geq 1$ degree is established. Further, a plurality of recess portions 12a may be formed so as to be arranged at positions corresponding to the opening ranges $\theta_1$ of the respective fan-shaped holes 11 in the circumferential direction. Further, as shown in FIG. 10 in an enlarged manner, it is preferable to form an end portion 12b of the recess portion 12a positioned in a middle portion of the inner peripheral surface 12 of the pressure release port 10 at an acute angle with respect to the inner peripheral surface 12, and a smaller chamfer in a corner portion is better.

In this case, in the present aspect, the valve body 30 is formed in a slightly different shape from that of the first or second aspect described above, however, has the same basic structure. In other words, the valve body 30 is integrally formed on the reinforcing ring 31 by the rubber-like elastic material, and has a base portion 32 in which the reinforcing ring 31 is buried, a seal lip 33 extended from one end inner periphery thereof, and an extension spring 34 attached to the outer peripheral surface near the leading end in the seal lip 33. Further, as shown in FIG. 8, a cylindrical surface-shaped pressure contact portion 32b having an appropriately larger diameter than the inner peripheral surface 12 of the pressure release port 10 in a state of not being attached is formed in an outer peripheral surface of the base portion 32.

The rubber-like elastic material forming the base portion 32 and the seal lip 33 of the valve body 30 can be selected from the saturated rubber, the thermoplastic elastomer, the mixture of the resin material and the rubber, the block copolymer, the graft copolymer and the like, as described above in the first aspect. The inner peripheral lip 33a of the seal lip 33 is set to be R0.2 or more in order to secure a desired close contact width with respect to the outer peripheral surface of the shaft part 20, and an angle α of an outer taper surface and an angle β of an inner taper surface of the lip 33a with respect to the cylindrical surface around an axis O are set between 5 and 90 degree, as shown in FIG. 11. Further, either the angles α or β may be set to be relatively larger.

In this case, the recess portion 12a in the inner peripheral surface 12 of the pressure release port 10 is formed by a metal mold element which can be pulled out to an inner side of the sealing plate 3, at a time of forming the sealing plate 3. In other words, the metal mold element for forming the inner peripheral surface 12 of the pressure release port 10 and the outer peripheral surface of the shaft part 20 is pulled out to an upper side in FIGS. 6 and 8 at a time of releasing the mold, however, the metal mold element for forming the recess portion 12a is pulled out to a lower side in FIGS. 6 and 8 at a time of releasing the mold. Accordingly, it is possible to form the recess portion 12a without generating difficulty in releasing the mold.

In the structure mentioned above, the valve body 30 is pressure-inserted to a portion between the pressure release port 10 and the shaft part 20 from the outside of the sealing plate 3, in such a manner that the seal lip 33 is directed to the outside of the sealing plate 3, as shown in FIG. 8. At this time, the pressure contact portion 32b in the base portion 32 of the valve body 30 is exposed to a diametrical compression between the reinforcing ring 31 buried in the base portion 32 and the inner peripheral surface 12 of the pressure release port 10. In other words, a collapsing margin corresponding to a difference between the inner diameter of the pressure release port 10 and the outer diameter of the pressure contact portion 32b in the base portion 32 is applied to the pressure contact portion 32b. However, the portion reaching each of the recess portions 12a formed in the inner peripheral surface 12 of the pressure release port 10 in the pressure contact portion 32b is elastically restored from the compression state so as to be in a state of protruding into each of the recess portions 12a, in a process that the inner end (the lower end) of the base portion 32 is pressure-inserted until the inner end of the base portion 32 is brought into contact with the bridging portion 22.

Accordingly, once the valve body 30 is pressure-inserted to the pressure release port 10 from the outside of the sealing plate 3 until the inner end (the lower end) of the base portion 32 is brought into contact with the bridging portion 22, the valve body can not be easily detached on the basis of the fitting between the recess portion 12a and the pressure contact portion 32b. Accordingly, even in the case that the inner peripheral surface 12 of the pressure release port 10 has a slope that the diameter varies slightly larger toward the opening end portion in the opposite side to the bridging portion 22, in order to make it easy to release the mold after forming the sealing plate 3 with the synthetic resin material, or even in the case that the permanent strain with age is generated in the base portion 32 of the valve body 30 and the inner peripheral surface 12 of the pressure release port 10 due to a long time use, the disengaging load applied in the direction in which the valve body 30 is pulled out from the pressure release port 10 is maintained in a high state. In particular, a come-off prevention effect becomes higher by forming the end portion 12b of the recess portion 12a at an acute angle with respect to the inner peripheral surface 12, as shown in FIG. 10.

Further, it is not necessary to make the axial length of the base portion 32 of the valve body 30 longer for the purpose of increasing the disengaging load, so that it is possible to make the axial size of the valve body 30 small, and the resistance of pressure-insertion to the pressure release port 10 at a time of attaching becomes small.

Figure 12:
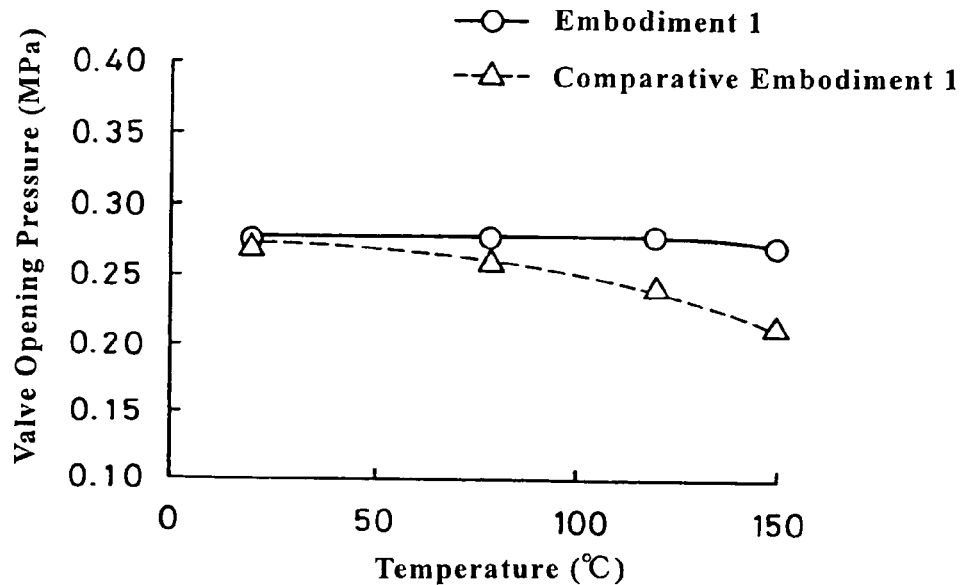
FIG. 12 is a schematic view showing a result obtained by testing a change of a valve opening pressure on the basis of a temperature.

The extension spring 34 is structured, in the same manner as the first and second aspects, such as to compensate for the reduction in the tensional force of the seal lip at a high temperature, and reduce a temperature dependence of the sealing property. FIG. 12 is a schematic view showing a result obtained by testing the change of the valve opening pressure in accordance with the temperature, with respect to an embodiment 1 provided with the structure in accordance with the third aspect shown in FIG. 6, and a comparative embodiment 1 in which an initial tensional force of the seal lip 33 itself is set to be equal to that of the embodiment 1, without using the extension spring 34. As is apparent from FIG. 12, the reduction in the valve opening pressure appears in accordance with the increase of the temperature, in the comparative embodiment 1 using no extension spring 34, however, the valve opening pressure is kept appropriately constant in a wide temperature range, in the embodiment 1 having the extension spring 34.

Figure 13:
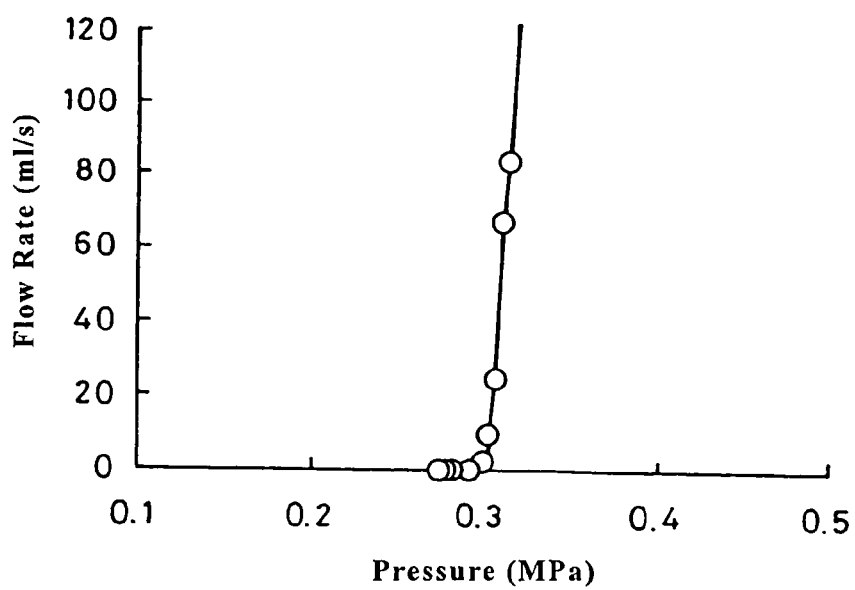
FIG. 13 is a schematic view showing a result obtained by testing a gas discharging property at a time when the valve is opened.

FIG. 13 is a schematic view showing a result obtained by testing a gas discharging property at a time of opening the valve, with respect to the embodiment 1 provided with the structure in accordance with the third aspect shown in FIG. 6. As shown in FIG. 13, when the pressure of the gas generated by the reaction of the electrolytic solution is increased to the valve opening pressure (about 0.28 MPa in this example), whereby the lip portion 33a of the seal lip 33 is disconnected from the outer peripheral surface of the shaft part 20 so as to be in the valve opening state, a large flow rate of gas is discharged by the thereafter slight pressure increase. Accordingly, it is not necessary to provide with the other explosion proofing valve or the like, and the structure is extremely effective as the pressure releasing means for the large-size capacitor or condenser in which a large amount of gas is generated.

Figure 14:
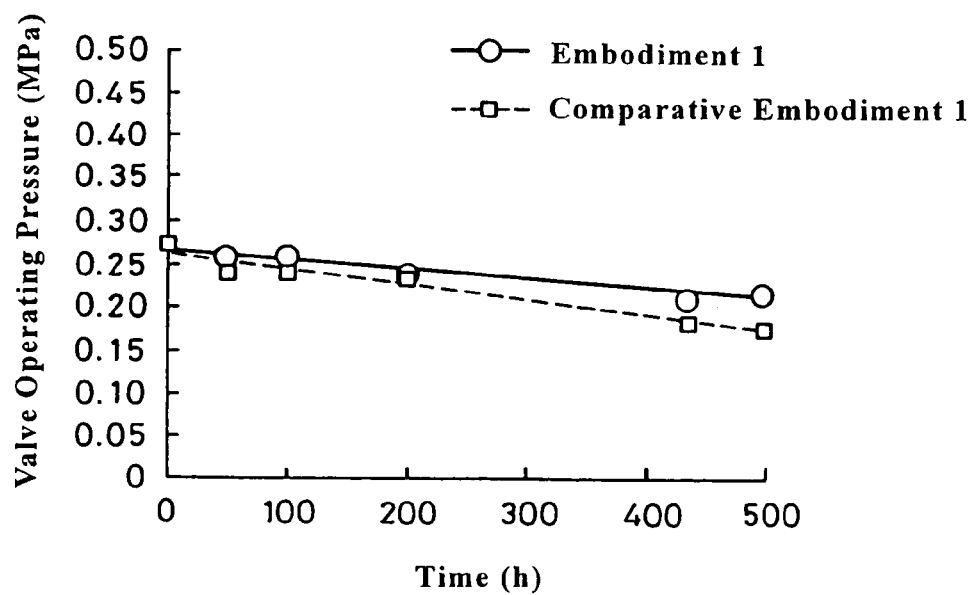
FIG. 14 is a schematic view showing a result obtained by testing a change of the valve opening pressure on the basis of an aging of a rubber material of a seal lip 33.

FIG. 14 is a schematic view showing a result obtained by testing a change in the valve opening pressure in accordance with aging of the rubber material of the seal lip 33, with respect to the embodiment 1 provided with the structure in accordance with the third aspect shown in FIG. 6, and the comparative embodiment 1 in which the initial tensional force of the seal lip 33 itself is set to be equal to that of the embodiment 1 without using the extension spring 34. The test is executed by aging the rubber material of the seal lip 33 with age by leaving it at a temperature of 120° C. and measuring the valve opening pressure. As is apparent from FIG. 14, it is known that the reduction in the valve opening pressure due to the aging is restricted in the embodiment 1 in which the tensional force is supplemented by the extension spring 34, in comparison with the comparative embodiment 1.

FIGS. 15 and 16 show an example in which the other spring than the extension spring 34 is employed as the tensional force supplementing means of the seal lip 33 against the high temperature and the aging. For example, the valve body 30 shown in FIG. 15 is provided with a spring 34' extending spirally in the circumferential direction, in the lip portion 33a of the seal lip 33, and the valve body 30 shown in FIG. 16 is provided with an annular leaf spring 34" having an approximately U-shaped bent cross section, from the inner periphery of the base portion 32 to the outer periphery of the lip portion 33a of the seal lip 33, however, the structure is not limited to those as far as an elastic body having a fastening effect. Further, the material of the springs 34' and 34" can be a metal material such as an iron, a copper, a titanium, a nickel and the like, and preferably is a stainless steel having a corrosion resistance. Further, the extension spring 34 and the other springs 34' and 34" are not necessarily provided in some set values of the valve opening pressure and some tensional forces of the seal lip 33 itself.

In the case that the pressure release valve 8 in accordance with each of the aspects mentioned above is provided in an electric double layer condenser (capacitor) using a nonaqueous electrolytic solution (a fourth onium $BF_4$ propylene carbonate solution or the like), there is a risk that the water vapor in the atmosphere transmits through the rubber-like elastic material of the valve body 30 in some rubber-like elastic materials of the valve body 30 so as to deteriorate the property of the condenser, and the service life becomes short.

For details, the electric double layer condenser includes two types comprising a type using an aqueous electrolytic solution (a vitriolic water solution or the like) and a type using the nonaqueous electrolytic solution mentioned above. In this case, the electric double layer condenser using the nonaqueous electrolytic solution is more excellent, taking into consideration a height of a generated voltage and a width of an allowable temperature range. However, in the type using the nonaqueous electrolytic solution, the service life which is said permanent is not established, if the water vapor makes an intrusion into the container. This is because the intruded water is electrolyzed so as to lower an electric strength, and is hydrolyzed with the component of the electrolytic solution so as to promote the deterioration. Further, if the electrolytic solution is hydrolyzed, a carbon dioxide gas is generated so as to cover a surface of an inner portion of an activated carbon electrode, so that a reduction in a capacitance is generated.

The rubber-like elastic material forming the base portion 32 of the valve body 30 and the seal lip 33 is selected from the saturated rubber, the thermoplastic elastomer, the mixture of the resin material and the rubber, the block copolymer, the graft copolymer and the like, as described above in the first aspect, and generally employed are an ethylene propylene rubber (EPDM) and a silicone rubber which are excellent in a weather resistance, however, in the case of the pressure release valve of the electric double layer capacitor using the nonaqueous electrolytic solution, a butyl rubber is used for the reason mentioned above. Because the butyl rubber has a sufficiently lower water vapor permeability in comparison with the EPDM. Accordingly, by using the butyl rubber for the rubber-like elastic material of the valve body 30, it is possible to reduce the water vapor from making an intrusion into the container, it is possible to prevent the reduction of the electric strength due to the electrolysis of the intruded water, the deterioration of the electrolytic solution due to the hydrolysis and the reduction of the capacitance, and it is possible to improve the service life of the electric double layer capacitor.

Table 1 shows a result obtained by testing for verifying a water vapor transmission factor of the pressure release valve using the butyl rubber and the pressure release valve using the EPDM. This test is executed by leaving a sealed container (an embodiment 2) provided with the pressure release valve using the butyl rubber as the rubber-like elastic material, and a sealed container (a comparative embodiment 2) provided with the pressure release valve using the EPDM as the rubber-like elastic material, in the atmosphere having a temperature 60° C. and a humidity 90 RH. The structure of the pressure release valve is the structure shown in FIG. 6. Further, a drying agent is set for replacing the air in the sealed container by the dry air at an early stage, and the completely sealed container having the same structure is simultaneously left in the atmosphere mentioned above as a reference together with the sealed containers in accordance with the embodiment 2 and the comparative embodiment 2. Then, a change in weight is measured after 2000 hour has passed, with respect to each of them. As a result, as shown in Table 1, the water vapor transmission factor is about a quarter in the embodiment 2 using the butyl rubber for the rubber-like elastic material of the valve body, in comparison with the comparative embodiment 2 using the EPDM.

TABLE 1

|  | Weight ratio (ppm) with respect to reference after 2000 hour |
| --- | --- |
| Embodiment 2 | 2750 |
| Comparative embodiment 2 | 12320 |

[Fourth Aspect]

Figure 17:
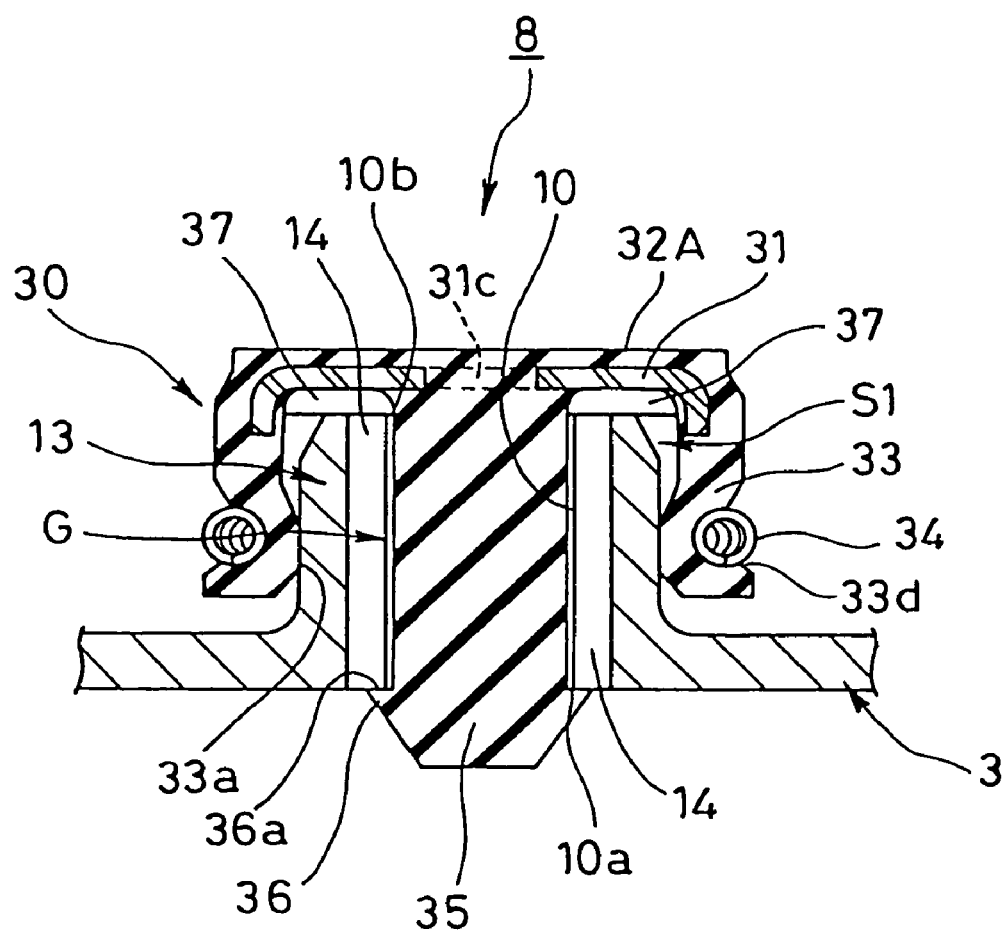
FIG. 17 is a cross sectional view showing a fourth preferable aspect of the pressure release valve applied to the electrolytic condenser or the electrolytic solution battery shown in FIGS. 1A and 1B, in a state of cutting along a line II–II' in FIG. 1B.
Figure 18:
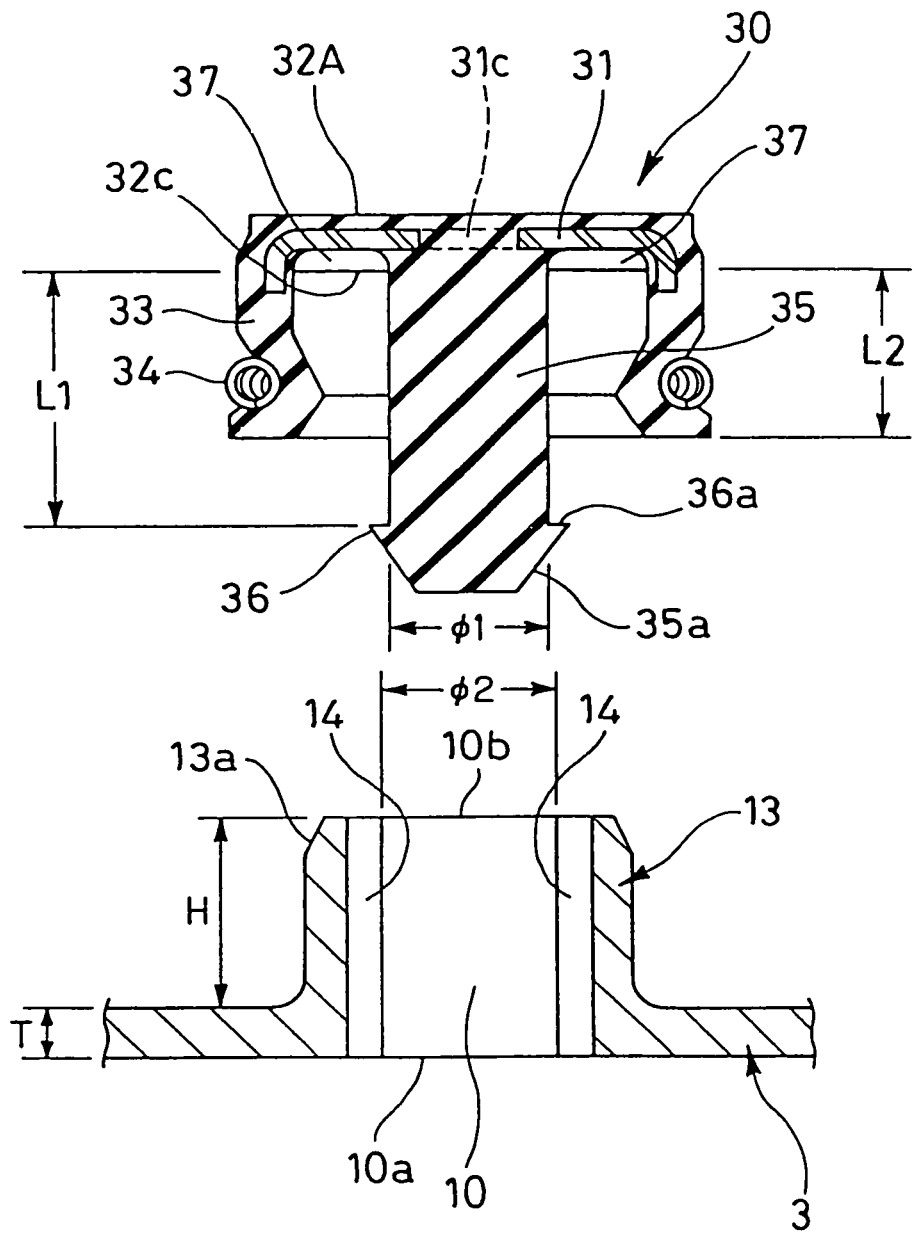
FIG. 18 is a cross sectional view showing a state in which the valve body is disconnected in the forth aspect, in a state of cutting along a line II–II' in FIG. 1B.
Figure 19:
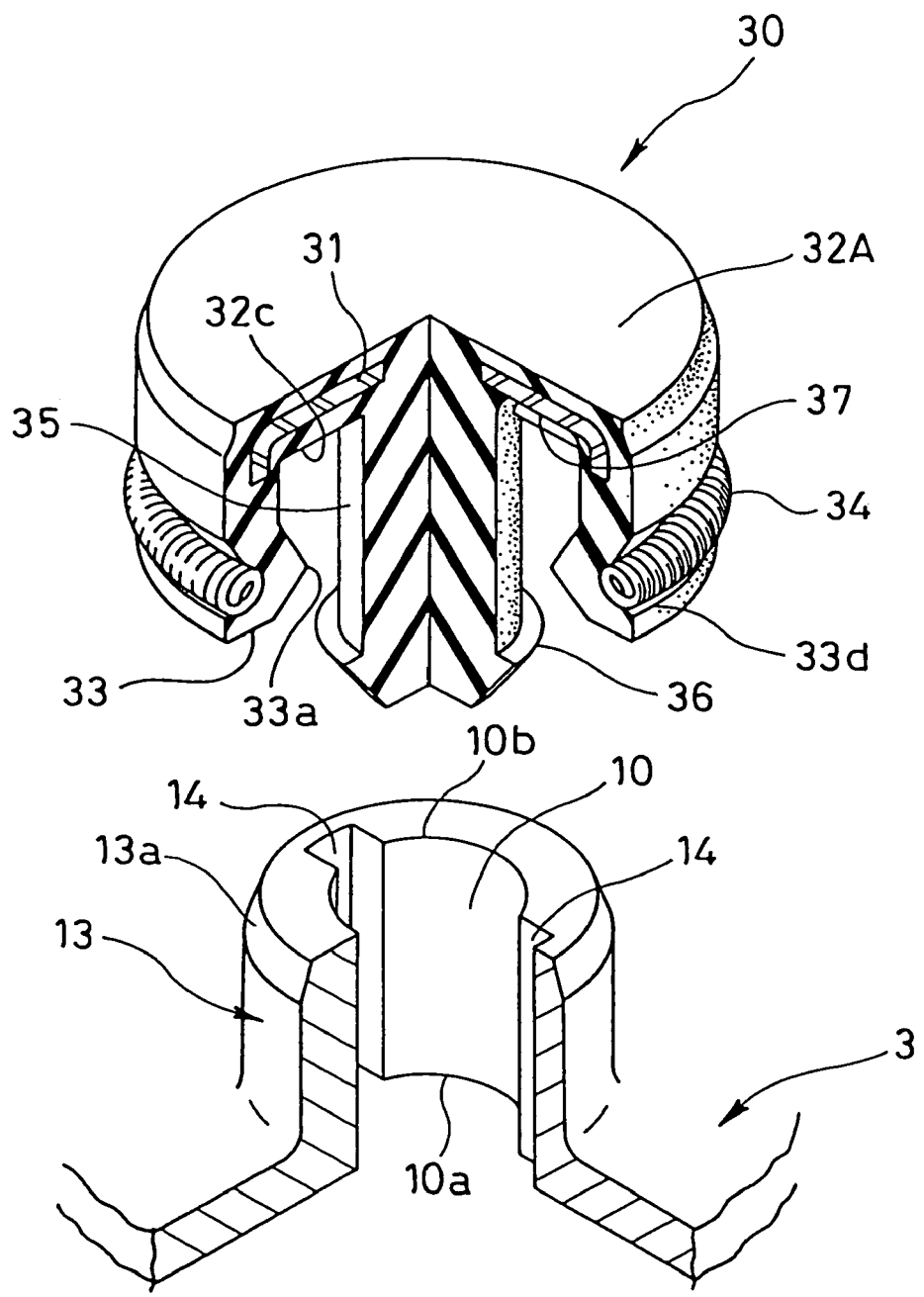
FIG. 19 is a perspective view showing a state in which the valve body is disconnected in the fourth aspect, in a state of partly cutting.
Figure 20:
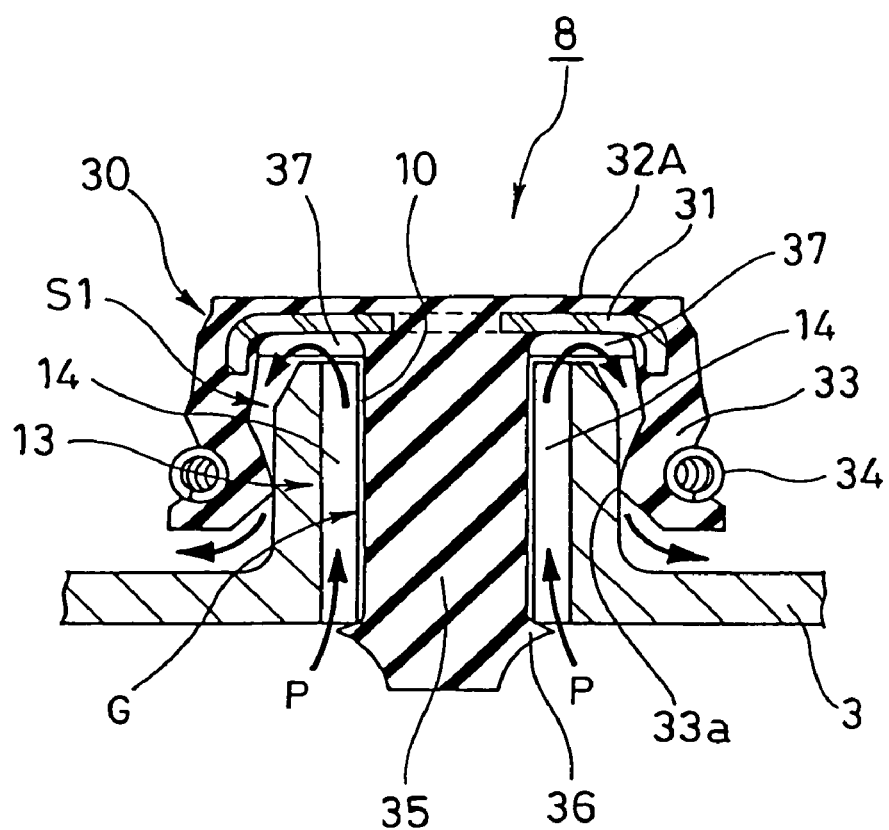
FIG. 20 is a cross sectional view showing a state in which the valve body is opened in the fourth aspect, in a state of cutting along a line II–II' in FIG. 1B.

FIG. 17 is a cross sectional view showing a fourth aspect of the pressure release valve 8 applied to the electrolytic condenser or the electrolytic solution battery shown in FIGS. 1A and 1B, in a state of cutting along a line II–II' in FIG. 1B, FIG. 18 is a cross sectional view showing a state in which the valve body 30 is disconnected in the present aspect, in a state of cutting along a line II–II' in FIG. 1B, FIG. 19 is a perspective view showing a state in which the valve body is disconnected in the present aspect, in a state of partly cutting, and FIG. 20 is a cross sectional view showing a state in which the valve body 30 is opened in the present aspect, in a state of cutting along a line II–II' in FIG. 1B. The pressure release valve 8 in accordance with the present aspect is constituted by a tubular holding portion 13 formed in a protruding manner in the sealing plate 3 and having the pressure release port 10 in the inner periphery, and a valve body 30 locking to the tubular holding portion 13.

For details, as is most apparently shown in FIGS. 18 and 19, the tubular holding portion 13 is formed in a cylindrical shape protruding toward the outside of the case 1 from the sealing plate 3, and a tapered chamfer 13a is applied to an outer peripheral surface of a leading end thereof. The pressure release port 10 in the inner periphery is formed so as to extend through the sealing plate 3. The pressure release port 10 is formed in a circular hole shape, and a pair of groove-shaped pressure passages 14 continuously extending to an outer end opening portion 10b from an inner end opening portion 10a is formed in symmetrical positions at 180 degree in the circumferential direction.

The valve body 30 is integrally formed on the reinforcing ring 31 with the rubber-like elastic material, and has a disc-shaped base portion 32A formed such that the reinforcing ring 31 is buried, a seal lip 33 cylindrically extended from an outer peripheral portion thereof, an extension spring 34 attached to an outer peripheral surface near a leading end in the seal lip 33, a shaft part 35 coaxially formed in an inner peripheral side of the seal lip 33 and extending from a center portion of the base portion 32A, and a collar-shaped locking portion 36 formed in an outer periphery of a leading end of the shaft part 35. Further, a plurality of groove-shaped pressure passages 37 extending in a diametrical direction are formed at a uniform interval in the circumferential direction, in an inner surface (a lower surface in the drawing) of the base portion 32A.

The reinforcing ring 31 is press-molded in a disc shape such that an outer peripheral portion is bent so as to extend to a part of the seal lip 33, and an inner peripheral portion of the reinforcing ring 31 is provided with a circular hole 31c for improving the material flow at a time of forming by the rubber-like elastic material and increasing a bonding strength with the rubber-like elastic material.

As shown in FIG. 18, a length L1 from the inner surface 32c of the base portion 32A in the valve body 30 to the locking portion 36 in the shaft part 35 is approximately equal to a sum of a protruding height H of the tubular holding portion 13 and a thickness T of the sealing plate 3. Further, an axial length L2 from the inner surface 32c of the base portion 32A to the leading end of the seal lip 33 is shorter than the protruding height H of the tubular holding portion 13.

An inner diameter of the lip portion 33a formed in the inner periphery of the leading end of the seal lip 33 is appropriately smaller than the outer diameter of the tubular holding portion 13, in a non-attached (disengaged) state shown in FIGS. 18 and 19. Further, the extension spring 34 is formed in a ring shape by bonding both ends of the coil spring, and is fitted to the circumferential groove 33d formed in the outer peripheral surface of the seal lip 33 in a suitably expanded state.

As shown in FIG. 18, an outer diameter φ1 of the shaft part 35 is slightly smaller than an inner diameter φ2 of the pressure release port 10, and an outer peripheral edge of the locking portion 36 is slightly larger than the inner diameter of the pressure release port 10 and is arranged in an inner peripheral side of a diametrical position of a groove bottom of the pressure passage 14. Further, an outer peripheral surface 35a from a leading end of the shaft part 35 to the locking portion 36 is formed in a taper shape in which the leading end side of the shaft part 35 has a smaller diameter, and a back surface 36a of the locking portion 36 is formed in a flat surface approximately perpendicular to the axis of the shaft part 35.

The valve body 30 can be easily attached only by pressure-inserting to the tubular holding portion 13 from a separated state shown in FIGS. 18 and 19 so as to insert the shaft part 35 to the pressure release port 10, because the lip portion 33a in the inner periphery of the leading end of the seal lip 33 is brought into close contact with the outer peripheral surface of the tubular holding portion 13 in the sealing plate 3, the shaft part 35 is loosely fitted to the pressure release port 10, the inner surface 32c of the base portion 32A is brought into contact with the leading end surface of the tubular holding portion 13, and the locking portion 36 is engaged with the edge portion of the inner end opening portion 10a in the pressure release port 10, as shown in FIG. 17.

Further, the attaching work can be executed in a final assembly step of the condenser or the battery, after injecting the electrolytic solution into the case 1 shown in FIGS. 1A and 1B. Accordingly, it is possible to restrict the evaporation of the electrolytic solution generated in the assembling process to the minimum, and it is possible to intend to stabilize the quality of the product.

In the attached state shown in FIG. 17, the seal lip 33 exists in such a manner that the lip portion 33a is in close contact with the outer peripheral surface of the tubular holding portion 13 with a proper collapsing margin, on the basis of the tensional force of its own elasticity and the tensional force of the extension spring 34, and the base portion 32A closes the outer end opening portion 10b of the pressure release port 10. Further, since the outer peripheral edge of the locking portion 36 exists in the inner peripheral side of the diametrical position of the groove bottom of the pressure passage 14 formed in the pressure release port 10, the inner end of the pressure passage 14 is exposed from the outer periphery of the locking portion 36 so as to be open to an inner space of the sealing plate 3 (an inner space of the case 1) S2, in this attached state.

In this case, it is possible to suitably select the material of the reinforcing ring 31 in the valve body 30, the material of the rubber-like elastic material forming the base portion 32A and the seal lip 33, the material of the extension spring 34 and the like from the material described in the first aspect. Further, in this aspect, the elastic body having a fastening effect can be used as the means for compensating the reduction of the tensional force of the seal lip 33, in addition to the extension spring 34, and the other springs can be used as described above in FIGS. 15 and 16.

In the pressure release valve 8 provided with the structure mentioned above, the pressure of the gas generated by the reaction of the electrolytic solution sealed within the case 1 shown in FIGS. 1A and 1B (the internal pressure of the case 1) reaches an annular space S1 between the outer peripheral surface of the tubular holding portion 13 and the seal lip 33 of the valve body 30 from the case internal space S2 shown in FIGS. 17 and 20, via the pressure passage 14 open to the inner space S2 in the 180 degree symmetrical position in the outer periphery of the locking portion 36, the gap G between the pressure release port 10 and the shaft part 35, and a plurality of pressure passages 37 formed in the inner surface 32c of the base portion 32A in the valve body 30. The internal pressure is applied as a valve opening force for opening the seal lip 33 to an outer peripheral side, to the inner peripheral surface of the seal lip 33 from the annular space S1.

Further, since the inner pressure of the case 1 is applied in the direction of pulling out the valve body 30 from the tubular holding portion 13, the locking portion 36 in a state of being engaged with the edge portion of the inner end opening portion 10a of the pressure release port 10 is exposed to a deformation. Further, pressure (breakaway pressure) required for canceling an engagement state with the inner end opening portion 10a of the pressure release port 10 by the locking portion 36 being deformed so as to be completely inverted, is set to a predetermined higher pressure value than a pressure value (valve opening pressure) required for operating the seal lip 33 so as to open the valve and making the seal lip 33 to move up from the outer peripheral surface of the tubular holding portion 13. Further, the valve opening pressure and the breakaway pressure can be suitably set in correspondence to an inner diameter, thickness and a cross sectional shape of the seal lip 33, an outer diameter of the tubular holding portion 13, tensional force of the extension spring 34, thickness and a shape of the locking portion 36 and the like.

Accordingly, in accordance with the pressure release valve 8, in the case that the valve opening force generated by the internal pressure of the case 1 becomes larger than the valve closing force obtained by the elasticity of the seal lip 33 itself and the tensional force of the extension spring 34, the lip portion 33a of the seal lip 33 comes apart from the outer peripheral surface of the tubular holding portion 13 so as to generate the valve opening state, and the internal pressure P is released to the atmospheric air in the external through the pressure passages 14 and 37 while expanding the lip portion 33a to the outer peripheral side, as shown by a thick arrow in FIG. 20. Further, at this time, since the heat within the case 1 is also discharged to the atmospheric air, it is possible to prevent the reduction in function of the condenser or the battery due to the heat.

When the internal pressure P is released by the valve opening of the seal lip 33, and descends to be a predetermined value or less, the seal lip 33 immediately closes the valve by the restoring force obtained by its own elasticity and the tensional force of the extension spring 34, and the lip portion 33a is brought into close contact with the outer peripheral surface of the tubular holding portion 13. Accordingly, it is possible to shut off the intrusion of the water vapor and the foreign matter from the external, and it is possible to prevent the electrolytic solution from being reduced due to the evaporation.

Further, since the internal pressure P is the set valve of opening pressure or less under the normal use state, the seal lip 33 is in the valve closing state of being in close contact with the tubular holding portion 13 as shown in FIG. 17, and it is possible to prevent the water vapor and the foreign matter from making an intrusion from the external. Further, as mentioned above, since the seal lip 33 is in the valve open state only in the case that the internal pressure is increased more than the valve opening pressure, it is possible to restrict the reduction of the electrolytic solution due to the evaporation or the like to the minimum, and it is possible to improve the service life of the condenser or the battery.

Further, in the case that the internal pressure P of the case 1 is suddenly increased due to generation of some kind of abnormalities, and an ascension rate of the internal pressure P is larger than a pressure release speed generated by the valve opening of the seal lip 33, a deforming force applied to the locking portion 36 in accordance with the increase of the internal pressure P becomes large. Further, when the internal pressure P is increased more than the set breakaway pressure, the locking portion 36 is deformed so as to be completely inverted, whereby the engagement state with the inner end opening portion 10a of the pressure release port 10 is canceled. Accordingly, the valve body 30 breaks away from the tubular holding portion 13 as shown in FIGS. 18 and 19 on the basis of the internal pressure P applied to the leading end of the shaft part 35, the inner surface 32c of the base portion 32A and the like. accordingly, the pressure release port 10 is completely open to the external, rapidly releases the internal pressure P to the atmospheric air and prevents the case from being exploded.

In other words, the pressure release valve 8 having the structure mentioned above has a primary function of releasing the internal pressure P at a time when the internal pressure P is increased to some extent, and a function serving as an explosion proofing valve, at the same time. Further, since the valve body 30 is formed in a shape which is put on the tubular holding portion 13 constituting the pressure release port 10 from the above, the foreign matter, the liquid and the like do not pile up in the upper portion of the pressure release port 10 as in the case that the valve body 30 is attached in the pressure release port 10, so that it is possible to achieve a stable function.

[Fifth Aspect]

Figure 21:
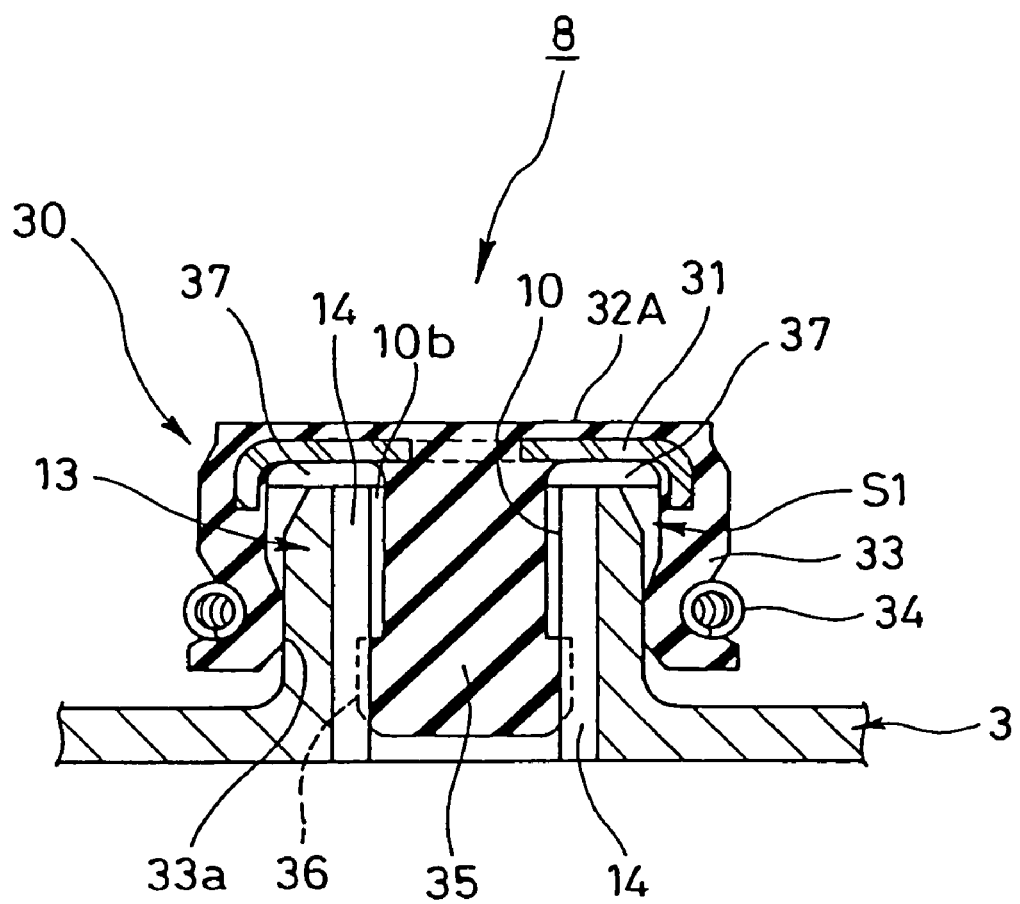
FIG. 21 is a cross sectional view showing a fifth preferable aspect of the pressure release valve applied to the electrolytic condenser or the electrolytic solution battery shown in FIGS. 1A and 1B, in a state of cutting along the line II–II' in FIG. 1B.
Figure 22:
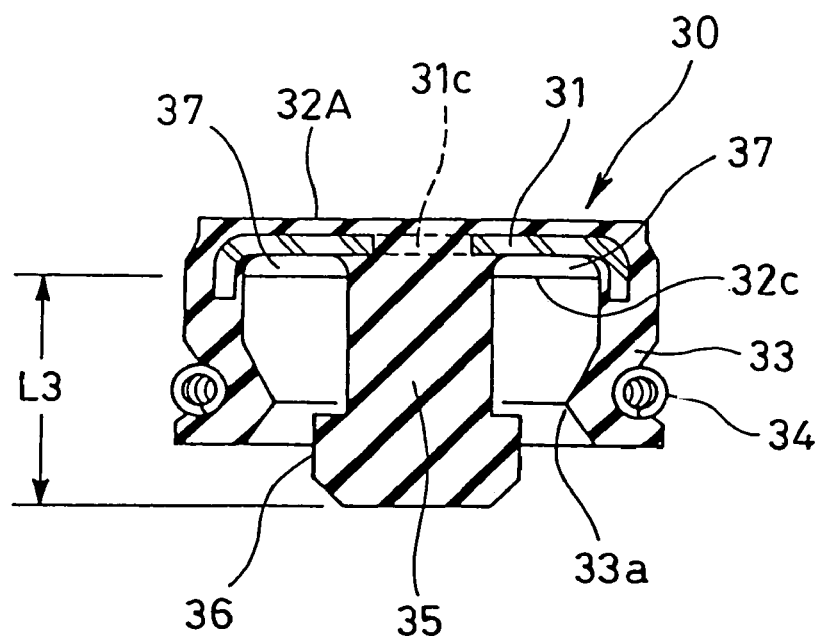
FIG. 22 is a cross sectional view showing a state in which the valve body is disconnected in the fifth aspect, in a state of cutting along a line II–II' in FIG. 1B.
Figure 22:
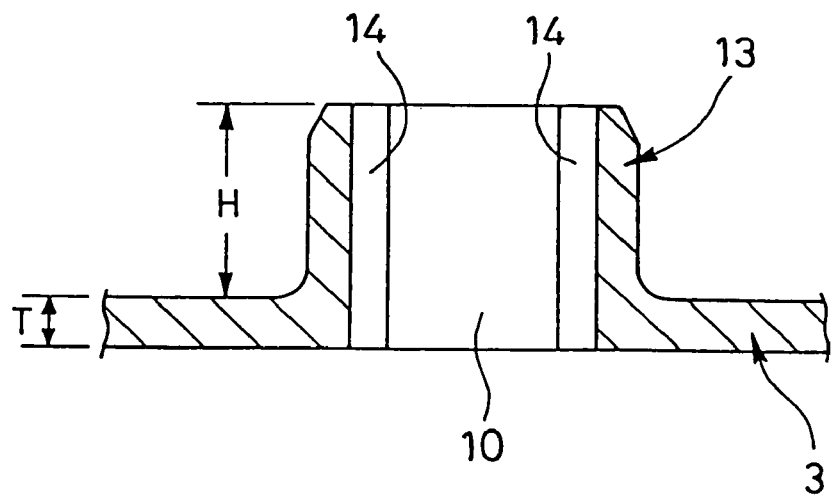

FIG. 21 is a cross sectional view showing a fifth aspect of the pressure release valve 8 applied to the electrolytic condenser or the electrolytic solution battery shown in FIGS. 1A and 1B, in a state of cutting along the line II–II' in FIG. 1B, and FIG. 22 is a cross sectional view showing a state in which the valve body 30 is disconnected in the present aspect, in a state of cutting along a line II–II' in FIG. 1B. The pressure release valve 8 in accordance with the present aspect is different from the fourth aspect shown in FIGS. 17 to 20, in the locking structure of the valve body 30.

As shown in FIG. 22, a length L3 from the inner surface 32c of the base portion 32A in the valve body 30 to the leading end of the shaft part 35 is equal to or less than a length corresponding to a sum of the protruding height H of the tubular holding portion 13 and the thickness T of the sealing plate 3, and the outer diameter of the locking portion 36 formed in the outer periphery of the leading end of the shaft part 35 is formed at an appropriately larger diameter than the inner diameter of the pressure release port 10 in such a manner as to be pressure-inserted to the inner surface of the pressure release port 10 with a desired collapsing margin.

In the attached state shown in FIG. 21, the seal lip 33 exists in such a manner that the lip portion 33a in the inner periphery is in close contact with the outer peripheral surface of the tubular holding portion 13 with a proper collapsing margin, on the basis of the tensional force of its own elasticity and the tensional force of the extension spring 34, and the base portion 32A closes the outer end opening portion 10b of the pressure release port 10. Further, since the outer peripheral surface of the locking portion 36 is in a pressure contact with the inner surface of the pressure release port 10 with a predetermined collapsing margin, and a part thereof is in a slightly protruded state to such a degree of not closing the pressure passage 14 formed in the pressure release port 10, as shown by a broken line.

The structures of the other portions are the same as those of the fourth aspect shown in FIGS. 17 to 20.

In accordance with the present aspect, the valve body 30 is locked to the tubular holding portion 13 on the basis of a friction force of the locking portion 36 with respect to the inner surface of the pressure release port 10. Further, a pressure (a breakaway pressure) required for the valve body 30 to break away from the tubular holding portion 13 against the friction force is set to a predetermined higher pressure value than a pressure value (a valve opening pressure) required for operating the seal lip 33 so as to open the valve and making the seal lip 33 to move up from the outer peripheral surface of the tubular holding portion 13. Further, the breakaway pressure can be set in correspondence to a collapsing margin, a cross sectional shape and the like of the locking portion 36.

Accordingly, in the same manner as the fourth aspect, in the case that the valve opening force generated by the internal pressure of the case 1 shown in FIG. 1 becomes larger than the valve closing force obtained by the elasticity of the seal lip 33 itself and the tensional force of the extension spring 34, the seal lip 33 opens the valve so as to release the internal pressure to the atmospheric air. When the internal pressure descends to be a predetermined valve of opening pressure or less, the seal lip 33 closes the valve so as to shut off the intrusion of the water vapor and the foreign matter from the external, and prevent the electrolytic solution from being reduced due to the evaporation. Further, in the case that the internal pressure of the case 1 is increased more than the set breakaway pressure due to generation of some kind of abnormalities, the locking portion 36 slips with respect to the inner surface of the pressure release port 10 on the basis of the moving force in the breakaway direction due to the internal pressure applied to the leading end of the shaft part 35, the inner surface 32c of the base portion 32A and the like, and the valve body 30 breaks away from the tubular holding portion 13 so as to suddenly release the internal pressure to the atmospheric air and prevent the case 1 from being exploded.

In this case, in each of the aspects mentioned above, the description is given of the structure in which the present invention is applied to the sealing plate sealing the case of the condenser or the battery, however, the present invention can be applied to a pressure release mechanism of the other general pressure containers.

INDUSTRIAL APPLICABILITY

In accordance with the pressure release valve on the basis of the first aspect of the present invention, since the valve body which is closely fitted and fixed within the pressure release port provided in the sealing plate sealed in the opening portion of the pressure container has the seal lip which is closely contacted with the outer peripheral surface of the shaft part coaxially provided within the pressure release port and is directed to the outside of the pressure container, the seal lip is operated so as to open the valve, thereby releasing the internal pressure to the atmospheric air, in the case that the internal pressure of the pressure container is increased more than the predetermined value. Accordingly, it is possible to prevent the pressure container from being broken due to the increase of the internal pressure, and it is possible to optionally set the valve opening pressure on the basis of the tensional force of the seal lip. Further, since the seal lip immediately closes the valve in the case that the internal pressure is released, it is possible to shut off the intrusion of the foreign matter from the external, and it is possible to restrict the discharge of the gas or the like within the pressure container to the minimum.

In accordance with the pressure release valve on the basis of the second aspect of the present invention, since the seal lip is operated so as to open the valve, thereby releasing the internal pressure to the atmospheric air, in the case that the internal pressure of the pressure container is increased more than the predetermined value, it is possible to restrict the internal pressure to be a fixed value or less so as to prevent the pressure container from being broken, and it is possible to optionally set the valve opening pressure on the basis of the tensional force of the seal lip. Accordingly, since the seal lip immediately closes the valve in the case that the internal pressure is reduced, it is possible to shut off the intrusion of the foreign matter from the external, and it is possible to restrict the discharge of the gas or the like within the pressure container to the minimum. Further, in the case that the internal pressure is rapidly and abnormally increased, the valve body breaks away from the tubular holding portion so as to completely release the pressure release port, and functions as the explosion proofing valve for preventing the pressure container from being exploded, so that it is not necessary to additionally provide with the explosion proofing valve.

In accordance with the pressure release valve on the basis of the third aspect of the present invention, the following effect can be obtained in addition to the effects obtained by the first aspect. Since the base portion of the valve body is closely fitted to the inner peripheral surface of the pressure release port with the proper collapsing margin and is in the state of being protruded into the recess portion formed in the inner peripheral surface of the pressure release port, only by pressure-inserting the valve body to the pressure release port of the sealing plate, it is possible to effectively prevent the valve body from breaking away from the pressure release port even in the case that the inner peripheral surface of the pressure release port has a slope of diameter being slightly larger toward the opening end portion in the outer side, or even in the case that the permanent strain with age is generated in the base portion of the valve body and the inner peripheral surface of the pressure release port.

In accordance with the pressure release valve on the basis of the fourth aspect of the present invention, the following effect can be obtained in addition to the effects obtained by the first or second aspect. Since the seal lip has a plurality of lip portions, a sealing property at a time of closing the valve is improved, and the valve opening pressure becomes high, whereby it is possible to prevent the gas leak or the like due to a slight increase of the internal pressure.

In accordance with the pressure release valve on the basis of the fifth aspect of the present invention, the following effect can be obtained in addition to the effects obtained by the first or second aspect. Since the spring is attached to the seal lip, the reduction in the valve opening pressure can be compensated by the spring even in the case that softening due to a high temperature and aging with age are generated in the material of the seal lip, so that it is possible to maintain a stable performance.

In accordance with the pressure release valve on the basis of the sixth aspect of the present invention, the following effect can be obtained in addition to the effects obtained by the second aspect. Since the valve body is attached so as to be put on the tubular holding portion forming the pressure release port from the above, it is easy to attach, and the foreign matter, the liquid and the like are not piled in the upper portion of the pressure release port as is different from the case of being attached in a received state within the pressure release port, so that it is possible to achieve a stable function.

In accordance with the pressure release valve on the basis of the seventh aspect of the present invention, the following effect can be obtained in addition to the effects obtained by the second or sixth aspect. Since the locking portion is locked to the inner end opening portion of the pressure release port, and the locking state of the pressure release port with the inner end opening portion is cancelled on the basis of the deformation of the locking portion made of the rubber-like elastic material, at a time when the load in the extracting direction on the basis of the internal pressure of the pressure container becomes the predetermined value or more, it is possible to set a stable breakaway pressure.

In accordance with the pressure release valve on the basis of the eighth aspect of the present invention, the following effect can be obtained in addition to the effects obtained by the second or sixth aspect. Since the slip of the locking portion is generated with respect to the inner surface of the pressure release port and the locking state is cancelled, at a time when the load in the extracting direction on the basis of the internal pressure of the pressure container is the predetermined value or more, it is possible to set the stable breakaway pressure.

In accordance with the pressure release valve on the basis of the ninth aspect of the present invention, since the recess portion described in the third aspect is extended in the axial direction toward the position in correspondence to the portion between a plurality of bridging portions connecting the pressure release port to the shaft part, it is possible to form by the metal mold element which is extracted in the opposite direction to the metal mold element for forming the pressure release port and the shaft part.

In accordance with the pressure release valve on the basis of the tenth aspect of the present invention, it is possible to restrict the breakage and the heat generation of the case due to the generation of the abnormal internal pressure, the reduction of the electrolytic solution due to the evaporation or the like, and restrict the reduction of the function, by applying the pressure release valve to the case of the electrolytic condenser and battery. Further, since the valve body can be pressure-inserted and attached after injecting the electrolytic solution into the case, it is possible to restrict the evaporation of the electrolytic solution generated at a time of assembling to the minimum, and it is possible to achieve a stability in the quality of the product.

What is claimed is:

1. A pressure release valve comprising:
    a tubular holding portion formed in a protruding manner in a sealing plate sealed in an opening portion of a pressure container and provided with a pressure release port in an inner periphery; and
    a valve body held in the tubular holding portion,
    wherein the valve body is integrally formed by a rubber-like elastic material in a reinforcing ring and has a seal lip which is closely contacted with said tubular holding portion by predetermined tensional force and is operated so as to open the valve by predetermined internal pressure within the pressure container and a locking portion to said tubular holding portion, and the locking state of the locking portion is cancelled at a time when predetermined pressure higher than valve opening pressure of said seal lip is applied.

2. The pressure release valve as claimed in claim 1, wherein the locking portion is locked to an inner end opening portion of the pressure release port in the state of the pressure passage being opened.

3. The pressure release valve as claimed in claim 1, wherein the locking portion is pressure-inserted to the inner periphery of the pressure release port with a predetermined collapsing margin, thereby being locked.

4. A pressure release valve comprising:
    a tubular holding portion formed in a protruding manner in a sealing plate sealed in an opening portion of a pressure container and provided with a pressure release port in an inner periphery; and a valve body held in the tubular holding portion, wherein the valve body is integrally formed by a rubber-like elastic material in a reinforcing ring and has a seal lip which is closely contacted with said tubular holding portion by predetermined tensional force and is operated so as to open the valve by predetermined internal pressure within the pressure container and a locking portion to said tubular holding portion, and the locking state of the locking portion is cancelled at a time when predetermined pressure higher than valve opening pressure of said seal lip is applied, the valve body having a base portion arranged so as to close an outer end opening portion of the pressure release port, the seal lip being extended from an outer periphery of said base portion so as to be closely contacted with an outer peripheral surface of the tubular holding portion, the locking portion being formed in a leading end of an elastic shaft part which is formed by a rubber-like elastic material so as to extend in an axial direction in an inner peripheral side of said seal lip from said base portion and being loosely inserted to the pressure release port, and a pressure passage being formed between said tubular holding portion and said base portion, and said elastic shaft part.

* * * * *